US012650692B2

(12) United States Patent
Dai et al.

(10) Patent No.: US 12,650,692 B2
(45) Date of Patent: Jun. 9, 2026

(54) ROBOT NAVIGATION METHOD, APPARATUS AND SYSTEM, ELECTRONIC DEVICE AND STORAGE MEDIUM

(71) Applicant: Rajax Network Technology (Shanghai) Co., Ltd., Shanghai (CN)

(72) Inventors: Xinyu Dai, Shanghai (CN); Kai Wang, Shanghai (CN); Huitao Hao, Shanghai (CN); Wei Min, Shanghai (CN); Pei Li, Shanghai (CN)

(73) Assignee: RAJAX NETWORK TECHNOLOGY (SHANGHAI) CO., LTD., Shanghai (CN)

( * ) Notice: Subject to any disclaimer, the term of this patent is extended or adjusted under 35 U.S.C. 154(b) by 525 days.

(21) Appl. No.: 17/601,699

(22) PCT Filed: Mar. 6, 2020

(86) PCT No.: PCT/CN2020/078242
§ 371 (c)(1),
(2) Date: Mar. 18, 2022

(87) PCT Pub. No.: WO2020/207164
PCT Pub. Date: Oct. 15, 2020

(65) Prior Publication Data
US 2022/0334585 A1 Oct. 20, 2022

(30) Foreign Application Priority Data
Apr. 10, 2019 (CN) .......................... 201910286659.0

(51) Int. Cl.
*G05D 1/00* (2024.01)
(52) U.S. Cl.
CPC ......... *G05D 1/0225* (2013.01); *G05D 1/0217* (2013.01); *G05D 1/0242* (2013.01); *G05D 1/0248* (2013.01)

(58) Field of Classification Search
CPC .. G05D 1/0225; G05D 1/0217; G05D 1/0242; G05D 1/0248
See application file for complete search history.

(56) References Cited

U.S. PATENT DOCUMENTS

2008/0161969 A1    7/2008  Lee et al.
2012/0323365 A1*   12/2012  Taylor .................... B25J 19/005
                                                  901/1
(Continued)

FOREIGN PATENT DOCUMENTS

CN        1530781 A       9/2004
CN        101375781 A     3/2009
(Continued)

OTHER PUBLICATIONS

Staying alive: a docking station for autonomous robot recharging, Silverman et al, IEEE May 2002 (Year: 2002).*
(Continued)

*Primary Examiner* — Navid Z. Mehdizadeh
*Assistant Examiner* — Oliver Tan
(74) *Attorney, Agent, or Firm* — Getech Law LLC; Jun Ye

(57) ABSTRACT

A robot navigation system includes: a first infrared receiving unit, a second infrared receiving unit, a distance measuring unit, and a processing unit, where the first infrared receiving unit and the second infrared receiving unit are disposed on a robot to receive a first infrared signal and a second infrared signal from an infrared transmission unit respectively; the distance measuring unit is disposed on the robot to obtain a distance signal indicating a distance between the robot and the target device; the processing unit is configured to: obtain the first infrared signal, the second infrared signal and the distance signal, control a moving direction of the robot based on the first infrared signal and the second infrared signal, and control the robot to move to the target device in (Continued)

response to determining that the robot enters a docking scope based on the distance signal.

20 Claims, 3 Drawing Sheets

(56) References Cited

U.S. PATENT DOCUMENTS

| 2017/0082751 | A1* | 3/2017 | Maisonnier | ............. G01S 17/46 |
| 2017/0105592 | A1* | 4/2017 | Fong | ....................... B25J 9/1666 |
| 2017/0147001 | A1 | 5/2017 | Shen et al. | |
| 2019/0196490 | A1* | 6/2019 | Xiong | ................... G01S 1/7032 |
| 2024/0119614 | A1* | 4/2024 | Ebrahimi Afrouzi | ... G01S 17/48 |

FOREIGN PATENT DOCUMENTS

| CN | 202498547 | U | 10/2012 |
| CN | 103317509 | A | 9/2013 |
| CN | 103645733 | A | 3/2014 |
| CN | 103948354 | A | 7/2014 |
| CN | 104298234 | A | 1/2015 |
| CN | 105629971 | A | 6/2016 |
| CN | 106125736 | A | 11/2016 |
| CN | 106774350 | A | 5/2017 |
| CN | 107134836 | A | 9/2017 |
| CN | 107305385 | A | 10/2017 |
| CN | 107817801 | A | 3/2018 |
| CN | 208522506 | U | 2/2019 |
| CN | 109491382 | A | 3/2019 |
| CN | 109991983 | A | 7/2019 |
| EP | 2756786 | A2 | 7/2014 |
| JP | 2017091396 | A | 5/2017 |
| KR | 101371036 | B1 | 3/2014 |
| WO | 2019062119 | A1 | 4/2019 |

OTHER PUBLICATIONS

Reduction of blind zone in ultrasonic transmitter/receiver transducers, Hernandez et al, Sci Direct Apr. 2006 (Year: 2006).*

State Intellectual Property Office of the People's Republic of China, Office Action and Search Report Issued in Application No. 2019102866590, Feb. 13, 2020, 23 pages. (Submitted with Machine/Partial Translation).

State Intellectual Property Office of the People's Republic of China, Office Action and Search Report Issued in Application No. 2019102866590, Apr. 8, 2020, 16 pages.(Submitted with Machine/Partial Translation).

State Intellectual Property Office of the People's Republic of China, Office Action and Search Report Issued in Application No. 2019102866590, May 29, 2020, 19 pages. (Submitted with Machine/Partial Translation).

ISA State Intellectual Property Office of the People's Republic of China, International Search Report Issued in Application No. PCT/CN2020/078242, May 14, 2020, WIPO, 4 pages.

ISA State Intellectual Property Office of the People's Republic of China, Written Opinion of the International Searching Authority Issued in Application No. PCT/CN2020/078242, May 14, 2020, WIPO, 13 pages. (Submitted with Machine/Partial Translation).

* cited by examiner

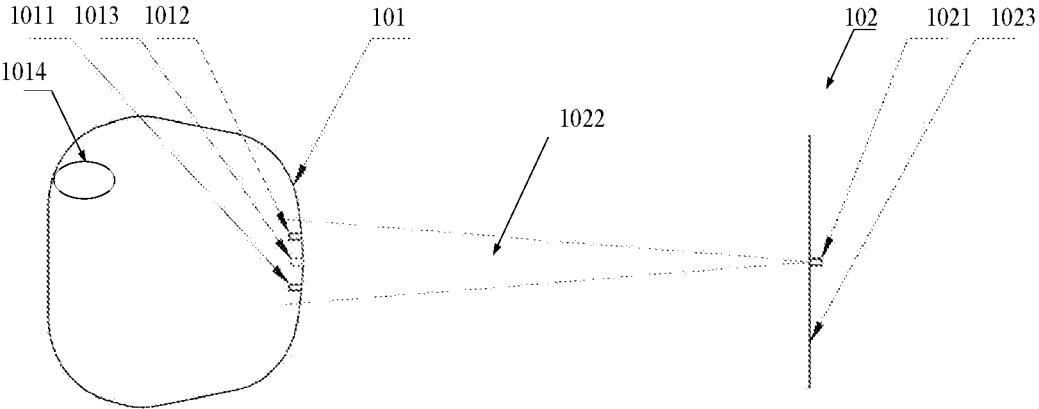

FIG.1

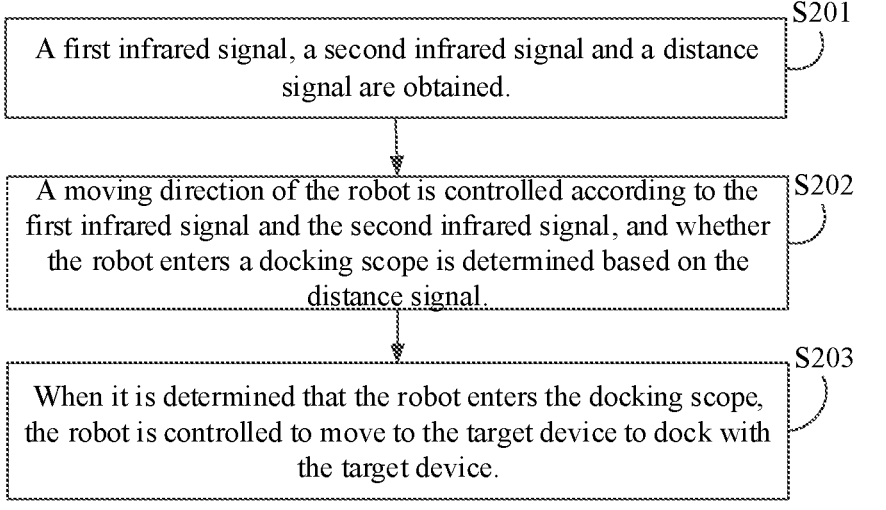

A first infrared signal, a second infrared signal and a distance signal are obtained.

S201

A moving direction of the robot is controlled according to the first infrared signal and the second infrared signal, and whether the robot enters a docking scope is determined based on the distance signal.

S202

When it is determined that the robot enters the docking scope, the robot is controlled to move to the target device to dock with the target device.

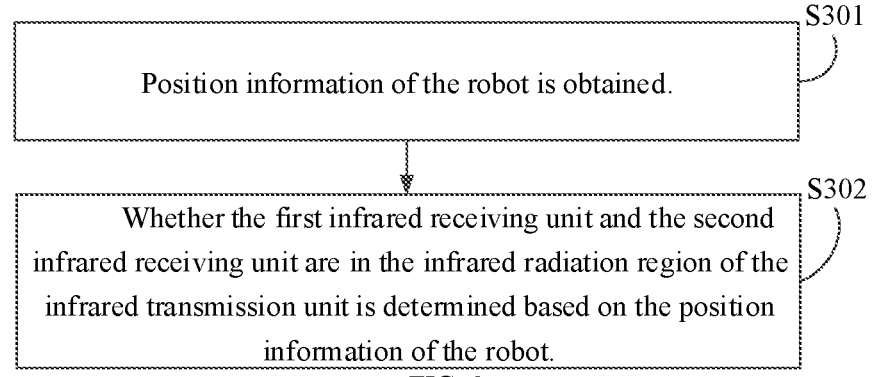

Position information of the robot is obtained.

S301

Whether the first infrared receiving unit and the second infrared receiving unit are in the infrared radiation region of the infrared transmission unit is determined based on the position information of the robot.

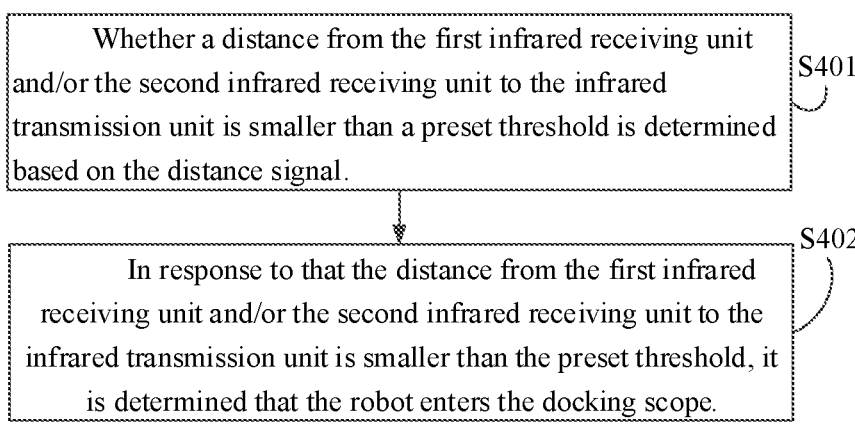

Whether a distance from the first infrared receiving unit and/or the second infrared receiving unit to the infrared transmission unit is smaller than a preset threshold is determined based on the distance signal.    S401

In response to that the distance from the first infrared receiving unit and/or the second infrared receiving unit to the infrared transmission unit is smaller than the preset threshold, it is determined that the robot enters the docking scope.    S402

FIG. 4

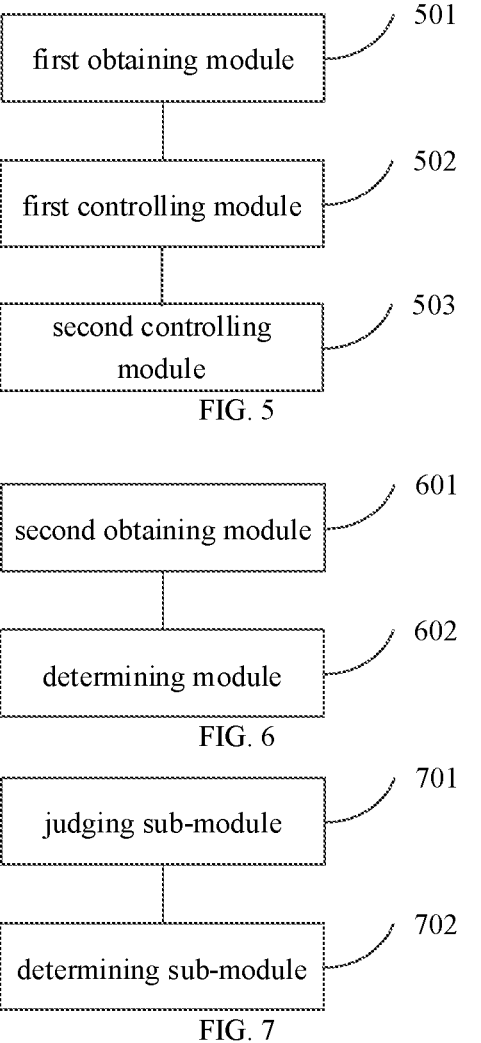

first obtaining module    501 first controlling module    502 second controlling module    503

FIG. 5 second obtaining module    601 determining module    602

FIG. 6 judging sub-module    701 determining sub-module    702

FIG. 7

ROBOT NAVIGATION METHOD, APPARATUS AND SYSTEM, ELECTRONIC DEVICE AND STORAGE MEDIUM

CROSS REFERENCE TO RELATED APPLICATIONS

The present application is a U.S. National Phase application of PCT/CN2020/078242, filed Mar. 6, 2020, which claims priority to Chinese Patent Application No. CN201910286659.0 filed on Apr. 10, 2019, the entire content of which is incorporated herein by reference.

TECHNICAL FIELD

The present disclosure relates to the field of computer technologies, and in particular to a method, an apparatus, a system, an electronic device and a storage medium for robot navigation.

BACKGROUND

Nowadays, some office buildings and shopping malls and the like may set up robots to carry out commodity indoor delivery or intelligent cabinet to carry out intelligent services such as commodity storage. However, in these indoor environments, one of the problems to be solved is how to navigate a robot to a service cabin to realize accurate docking with an interface of the service cabin.

SUMMARY

One or more embodiments of the present disclosure provide a method, an apparatus, a system, an electronic device and a computer readable storage medium for robot navigation.

According to a first aspect of embodiments of the present disclosure, provided is a robot navigation system, including a first infrared receiving unit, a second infrared receiving unit, a distance measuring unit, and a processing unit. The first infrared receiving unit and the second infrared receiving unit are disposed on a robot to receive a first infrared signal and a second infrared signal from an infrared transmission unit respectively. The infrared transmission unit is disposed on a target device. The distance measuring unit is disposed on the robot to obtain a distance signal indicating a distance between the robot and the target device. The processing unit is configured to: obtain the first infrared signal, the second infrared signal and the distance signal, control a moving direction of the robot based on the first infrared signal and the second infrared signal, and control the robot to move to the target device to dock with the target device in response to determining that the robot enters a docking scope based on the distance signal.

In combination with a first aspect, in a first implementation of a first aspect of the present disclosure, the first infrared receiving unit and the second infrared receiving unit are symmetrically disposed on the robot; and/or, heights of the first infrared receiving unit and the second infrared receiving unit from the ground are both the same as a height of the infrared transmission unit from the ground.

In combination with the first aspect and/or the first implementation of the first aspect, in a second implementation of the first aspect of the present disclosure, the distance measuring unit comprises a laser ranging sensor which is disposed opposite to a laser ranging plane of the target device, and a height of the laser ranging sensor from the ground is between a top side and a base side of the laser ranging plane; the infrared transmission unit and the laser ranging plane are located in a same plane.

In combination with the first aspect, the first implementation of the first aspect, and/or the second implementation of the first aspect, in a third implementation of the first aspect of the present disclosure, the processing unit is further configured to: before obtaining the first infrared signal, the second infrared signal and the distance signal, obtain position information of the robot; determine whether the first infrared receiving unit and the second infrared receiving unit are in an infrared radiation region of the infrared transmission unit according to the position information of the robot.

In combination with the first aspect, the first implementation of the first aspect, the second implementation of the first aspect and/or the third implementation of the first aspect, in a fourth implementation of the first aspect of the present disclosure, the processing unit is further configured to: in response to determining that the first infrared receiving unit and the second infrared receiving unit are not in the infrared radiation region of the infrared transmission unit, control the robot to move toward the infrared radiation region of the infrared transmission unit.

In combination with the first aspect, the first implementation of the first aspect, the second implementation of the first aspect, the third implementation of the first aspect and/or the fourth implementation of the first aspect, in a fifth implementation of the first aspect of the present disclosure, the processing unit is further configured to: in response to determining that the first infrared receiving unit and the second infrared receiving unit enter the infrared radiation region of the infrared transmission unit, control the moving direction of the robot according to the first infrared signal and the second infrared signal.

In combination with the first aspect, the first implementation of the first aspect, the second implementation of the first aspect, the third implementation of the first aspect, the fourth implementation of the first aspect and/or the fifth implementation of the first aspect, in a sixth implementation of the first aspect of the present disclosure, the processing unit is further configured to: in response to that the first infrared receiving unit and the second infrared receiving unit receive the first infrared signal and the second infrared signal respectively, control the robot to move along a current moving direction; and/or, in response to that at least one of the first infrared receiving unit and the second infrared receiving unit fails to receive a corresponding signal of the first infrared signal and the second infrared signal, adjust the moving direction of the robot.

In combination with the first aspect, the first implementation of the first aspect, the second implementation of the first aspect, the third implementation of the first aspect, the fourth implementation of the first aspect, the fifth implementation of the first aspect and/or the sixth implementation of the first aspect, in a seventh implementation of the first aspect of the present disclosure, the processing unit adjusts the moving direction of the robot in the following manner: in response to that the first infrared receiving unit fails to receive the first infrared signal, the processing unit controls the robot to move away from the first infrared receiving unit until the first infrared receiving unit receives the first infrared signal; in response to that the second infrared receiving unit fails to receive the second infrared signal, the processing unit controls the robot to move away from the second infrared receiving unit until the second infrared receiving unit receives the second infrared signal; in response to that the first infrared receiving unit fails to receive the first infrared signal and the second infrared receiving unit also fails to receive the second infrared signal, the processing unit controls the robot to move away from the first infrared receiving unit or the second infrared receiving unit until the first infrared receiving unit and the second infrared receiving unit receive the first infrared signal and the second infrared signal respectively.

In combination with the first aspect, the first implementation of the first aspect, the second implementation of the first aspect, the third implementation of the first aspect, the fourth implementation of the first aspect, the fifth implementation of the first aspect, the sixth implementation of the first aspect and/or the seventh implementation of the first aspect, in an eighth implementation of the first aspect of the present disclosure, the processing unit is further configured to determine whether a distance from the first infrared receiving unit and/or the second infrared receiving unit to the infrared transmission unit is smaller than a preset threshold based on the distance signal; and in response to that the distance from the first infrared receiving unit and/or the second infrared receiving unit to the infrared transmission unit is smaller than the preset threshold, determine the robot enters the docking scope.

According to a second aspect of embodiments of the present disclosure, provided is a robot navigation method, including: obtaining a first infrared signal, a second infrared signal and a distance signal, where the first infrared signal and the second infrared signal are infrared signals received by a first infrared receiving unit and a second infrared receiving unit disposed on a robot from an infrared transmission unit disposed on a target device; the distance signal indicates a distance between the robot and the target device; controlling a moving direction of the robot according to the first infrared signal and the second infrared signal, and determining whether the robot enters a docking scope based on the distance signal; in response to determining that the robot enters the docking scope, controlling the robot to move to the target device to dock with the target device.

In combination with the second aspect, in a first implementation of the second aspect of the present disclosure, before obtaining the first infrared signal, the second infrared signal and the distance signal, the method further includes: obtaining position information of the robot; determining whether the first infrared receiving unit and the second infrared receiving unit are in an infrared radiation region of the infrared transmission unit according to the position information of the robot.

In combination with the second aspect and/or the first implementation of the second aspect, in a second implementation of the second aspect of the present disclosure, the method further includes: in response to determining that the first infrared receiving unit and the second infrared receiving unit are not in the infrared radiation region of the infrared transmission unit, controlling the robot to move toward the infrared radiation region of the infrared transmission unit.

In combination with the second aspect, the first implementation of the second aspect and/or the second implementation of the second aspect, in a third implementation of the second aspect of the present disclosure, controlling the moving direction of the robot according to the first infrared signal and the second infrared signal includes: in response to determining that the first infrared receiving unit and the second infrared receiving unit enter the infrared radiation region of the infrared transmission unit, controlling the moving direction of the robot according to the first infrared signal and the second infrared signal.

In combination with the second aspect, the first implementation of the second aspect, the second implementation of the second aspect and/or the third implementation of the second aspect, in a fourth implementation of the second aspect of the present disclosure, controlling the moving direction of the robot according to the first infrared signal and the second infrared signal includes: in response to that the first infrared receiving unit and the second infrared receiving unit receive the first infrared signal and the second infrared signal respectively, controlling the robot to move along a current moving direction; and/or, in response to that at least one of the first infrared receiving unit and the second infrared receiving unit fails to receive a corresponding signal of the first infrared signal and the second infrared signal, adjusting the moving direction of the robot.

In combination with the second aspect, the first implementation of the second aspect, the second implementation of the second aspect, the third implementation of the second aspect and/or the fourth implementation of the second aspect, in a fifth implementation of the second aspect of the present disclosure, adjusting the moving direction of the robot includes: in response to that the first infrared receiving unit fails to receive the first infrared signal, controlling the robot to move away from the first infrared receiving unit until the first infrared receiving unit receives the first infrared signal; in response to that the second infrared receiving unit fails to receive the second infrared signal, controlling the robot to move away from the second infrared receiving unit until the second infrared receiving unit receives the second infrared signal; where the first infrared receiving unit and the second infrared receiving unit are symmetrically disposed on the robot on a horizontal plane, and heights of the first infrared receiving unit and the second infrared receiving unit from the ground are both the same as a height of the infrared transmission unit from the ground; in response to that the first infrared receiving unit fails to receive the first infrared signal and the second infrared receiving unit also fails to receive the second infrared signal, controlling, by the processing unit, the robot to move away from the first infrared receiving unit or the second infrared receiving unit until the first infrared receiving unit and the second infrared receiving unit receive the first infrared signal and the second infrared signal respectively.

In combination with the second aspect, the first implementation of the second aspect, the second implementation of the second aspect, the third implementation of the second aspect, the fourth implementation of the second aspect and/or the fifth implementation of the second aspect, in a sixth implementation of the second aspect of the present disclosure, determining whether the robot enters the docking scope based on the distance signal includes: determining whether a distance from the first infrared receiving unit and/or the second infrared receiving unit to the infrared transmission unit is smaller than a preset threshold based on the distance signal; and in response to that the distance from the first infrared receiving unit and/or the second infrared receiving unit to the infrared transmission unit is smaller than the preset threshold, determining the robot enters the docking scope.

According to a third aspect of embodiments of the present disclosure, provided is a robot navigation apparatus, including:

a first obtaining module, configured to obtain a first infrared signal, a second infrared signal, and a distance signal, where the first infrared signal and the second infrared signal are infrared signals received by a first infrared receiving unit and a second infrared receiving unit disposed on a robot from an infrared transmission unit disposed on a target device; the distance signal indicates a distance between the robot and the target device; a first controlling module, configured to control a moving direction of the robot according to the first infrared signal and the second infrared signal, and determine whether the robot enters a docking scope based on the distance signal; and a second controlling module, configured to, in response to determining the robot enters the docking scope, control the robot to move to the target device to dock with the target device.

Functions may be implemented by hardware or by implementing corresponding software using hardware. The hardware/software includes one or more modules corresponding to the above functions. In a possible design, the robot navigation apparatus may structurally include a memory and a processor. The memory is used to store one or more computer instructions supporting the robot navigation apparatus to implement the robot navigation method according to the above second aspect, and the processor is configured to execute the computer instructions stored in the memory. The robot navigation apparatus may further include a communication interface for the robot navigation apparatus to communicate with other devices or communication network.

According to a fourth aspect of embodiments of the present disclosure, provided is an electronic device, including a memory and a processor. The memory is used to store one or more computer instructions which are executed by the processor to implement the following method steps: obtaining a first infrared signal, a second infrared signal and a distance signal; where the first infrared signal and the second infrared signal are infrared signals received by a first infrared receiving unit and a second infrared receiving unit disposed on a robot from an infrared transmission unit disposed on a target device; the distance signal indicates a distance between the robot and the target device; controlling a moving direction of the robot according to the first infrared signal and the second infrared signal, and determining whether the robot enters a docking scope based on the distance signal; in response to determining that the robot enters the docking scope, controlling the robot to move to the target device to dock with the target device.

In combination with the fourth aspect, in a first implementation of the fourth aspect of the present disclosure, before obtaining the first infrared signal, the second infrared signal and the distance signal, the method further includes: obtaining position information of the robot;

determining whether the first infrared receiving unit and the second infrared receiving unit are in an infrared radiation region of the infrared transmission unit according to the position information of the robot.

In combination with the fourth aspect and/or the first implementation of the fourth aspect, in a second implementation of the fourth aspect of the present disclosure, the processor further implements the following method steps: in response to determining that the first infrared receiving unit and the second infrared receiving unit are not in the infrared radiation region of the infrared transmission unit, controlling the robot to move toward the infrared radiation region of the infrared transmission unit.

In combination with the fourth aspect, the first implementation of the fourth aspect and/or the second implementation of the fourth aspect, in a third implementation of the fourth aspect of the present disclosure, controlling the moving direction of the robot according to the first infrared signal and the second infrared signal includes: in response to determining that the first infrared receiving unit and the second infrared receiving unit enter the infrared radiation region of the infrared transmission unit, controlling the moving direction of the robot according to the first infrared signal and the second infrared signal.

In combination with the fourth aspect, the first implementation of the fourth aspect, the second implementation of the fourth aspect and/or the third implementation of the fourth aspect, in a fourth implementation of the fourth aspect of the present disclosure, controlling the moving direction of the robot according to the first infrared signal and the second infrared signal includes: in response to that the first infrared receiving unit and the second infrared receiving unit receive the first infrared signal and the second infrared signal respectively, controlling the robot to move along a current moving direction; and/or, in response to that at least one of the first infrared receiving unit and the second infrared receiving unit fails to receive a corresponding signal of the first infrared signal and the second infrared signal, adjusting the moving direction of the robot.

In combination with the fourth aspect, the first implementation of the fourth aspect, the second implementation of the fourth aspect, the third implementation of the fourth aspect and/or the fourth implementation of the fourth aspect, in a fifth implementation of the fourth aspect of the present disclosure, adjusting the moving direction of the robot includes: in response to that the first infrared receiving unit fails to receive the first infrared signal, controlling the robot to move away from the first infrared receiving unit until the first infrared receiving unit receives the first infrared signal; in response to that the second infrared receiving unit fails to receive the second infrared signal, controlling the robot to move away from the second infrared receiving unit until the second infrared receiving unit receives the second infrared signal; wherein the first infrared receiving unit and the second infrared receiving unit are symmetrically disposed on the robot on a horizontal plane, and heights of the first infrared receiving unit and the second infrared receiving unit from the ground are both the same as a height of the infrared transmission unit from the ground; in response to that the first infrared receiving unit fails to receive the first infrared signal and the second infrared receiving unit also fails to receive the second infrared signal, controlling, by the processing unit, the robot to move away from the first infrared receiving unit or the second infrared receiving unit until the first infrared receiving unit and the second infrared receiving unit receive the first infrared signal and the second infrared signal respectively.

In combination with the fourth aspect, the first implementation of the fourth aspect, the second implementation of the fourth aspect, the third implementation of the fourth aspect, the fourth implementation of the fourth aspect and/or the fifth implementation of the fourth aspect, in a sixth implementation of the fourth aspect of the present disclosure, determining whether the robot enters the docking scope based on the distance signal includes: determining whether a distance from the first infrared receiving unit and/or the second infrared receiving unit to the infrared transmission unit is smaller than a preset threshold based on the distance signal; and in response to that the distance from the first infrared receiving unit and/or the second infrared receiving unit to the infrared transmission unit is smaller than the preset threshold, determining the robot enters the docking scope.

According to a fifth aspect of embodiments of the present disclosure, provided is a computer readable storage medium storing computer instructions used by the robot navigation apparatus, which includes computer instructions for implementing the robot navigation method according to the above second aspect.

The technical solutions of the exemplary embodiments of the present disclosure have the following beneficial effects: in an exemplary embodiment of the present disclosure, the robot is provided with two infrared receiving units to receive signals from a same infrared transmission unit on the target device, and thus controls the moving direction of the robot based on the infrared signals received by the two infrared receiving units such that the robot can move toward the target device transmitting infrared signals. Further, when the distance measuring unit disposed on the robot indicates the robot is close to a docking interface of the target device, the robot is controlled to directly move to the target device so as to dock with the target device. In the above technical solutions of exemplary embodiments of the present disclosure, two infrared receiving units, the distance measuring unit and one infrared transmission unit are adopted to achieve accurate navigation for the robot, thus reducing the costs of the navigation system and improving the accuracy.

It is understood that the above general descriptions and subsequent detailed descriptions are merely illustrative and explanatory rather than limiting of the present disclosure.

BRIEF DESCRIPTION OF DRAWINGS

To describe the technical solutions in the exemplary embodiments of the present disclosure or in the prior art more clearly, drawings required in descriptions of the embodiments or the prior art will be briefly introduced below. It is apparent that the drawings described below are merely exemplary embodiments of the present disclosure and other drawings may be obtained by those of ordinary skill in the prior art based on these drawings without paying creative work.

FIG. 1 is a structural schematic diagram of a robot navigation system according to an embodiment of the present disclosure.

FIG. 2 is a flowchart of a robot navigation method according to an embodiment of the present disclosure.

FIG. 3 is a flowchart of determining whether a robot enters an infrared radiation region according to an embodiment of the present disclosure.

FIG. 4 is a flowchart of step S102 according to the implementation shown in FIG. 1.

FIG. 5 is a structural block diagram of a robot navigation apparatus according to an embodiment of the present disclosure.

FIG. 6 is a structural block diagram of determining whether a robot enters an infrared radiation region according to an embodiment of the present disclosure.

FIG. 7 is a structural block diagram of a first controlling module 502 according to the implementation shown in FIG. 5.

DETAILED DESCRIPTION

Figure 8:
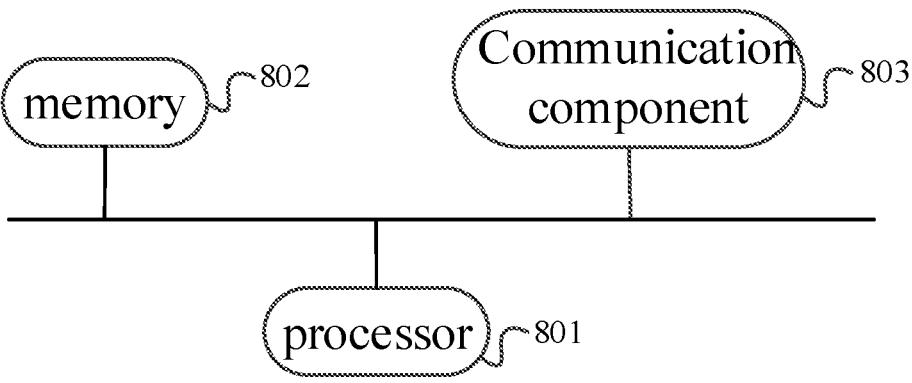
FIG. 8 is a schematic diagram of an electronic device suitable for implementing a robot navigation method according to an embodiment of the present disclosure.

The exemplary embodiments of the present disclosure will be described in details below in combination with accompanying drawings to enable those skilled in the art to implement them easily. Further, for the purpose of clarity, those parts irrelevant to descriptions of the exemplary embodiments are omitted in the accompanying drawings.

In the present disclosure, it should be understood that the terms such as "including" or "having" are intended to indicate presence of features, digits, steps, behaviors, components, parts or combinations thereof in the specification, and do not preclude the possibility that one or more other features, digits, steps, behaviors, components, parts or combinations thereof are present, or added.

In addition, it should be noted that in a case of no conflict, the embodiments and features of the embodiments in the present disclosure may be combined with each other. The present disclosure will be detailed below in combination with the accompanying drawings and specific embodiments.

FIG. 1 is a structural schematic diagram of a robot navigation system according to an embodiment of the present disclosure. As shown in FIG. 1, the robot navigation system includes a first infrared receiving unit 1011, a second infrared receiving unit 1012, a distance measuring unit 1013 and a processing unit 1014; where the first infrared receiving unit 1011 and the second infrared receiving unit 1012 are disposed on a robot 101 to receive a first infrared signal and a second infrared signal from an infrared transmission unit 1021 respectively. The infrared transmission unit 1021 is disposed on a target device 102; where the infrared receiving unit can be a signal receiver capable of receiving infrared signals, and the infrared transmission unit can be a signal transmitter capable of transmitting infrared signals, and the signal receiver and the signal transmitter can be realized by, for example, an infrared transmitter and receiver.

the distance measuring unit 1013 is disposed on the robot to obtain a distance signal indicating a distance between the robot 101 and the target device 102; where the distance measuring unit can be, for example, a laser ranging sensor and so on.

the processing unit 1014 is configured to obtain the first infrared signal, the second infrared signal and the distance signal, control a moving direction of the robot 101 based on the first infrared signal and the second infrared signal, and control the robot 101 to move to the target device 102 so as to dock with the target device 102 when determining the robot 101 enters a docking scope based on the distance signal; where the processing unit can be any hardware component or circuit with computing functions, signal processing functions, etc., for example, it can be a CPU or an embedded microcontroller, which is only illustrative and not intended to restrictive.

In an exemplary embodiment of the present disclosure, the robot 101 may be an intelligent robot having autonomous behavior capability, for example, a sweeping robot, a food taking robot, and a goods delivery robot and the like. The target device 102 may be a device fixed at a preset position to provide resources desired by the robot 101, including express package, foods, and power sources and the like. The target device 102 may be an intelligent food cabinet and a robot charge apparatus and the like. In a case of in need, the robot 101 may move to the target device 102 and obtain desired resources from the target device 102. Generally, the robot 101 needs to move to a precise position of the target device 102 to obtain corresponding resources correctly from the target device 102. For example, for a food taking robot 101, the robot 101 needs to move to the target device 102 and dock with a food provision interface on the target device 102 through a food loading interface disposed on the robot 101, such that foods on the target device 102 can be correctly loaded onto the robot 101.

The first infrared receiving unit 1011 and the second infrared receiving unit 1012 may be disposed on the robot 101. When the robot 101 moves toward the target device 102, the first infrared receiving unit 1011 and the second infrared receiving unit 1012 are located at a position opposed to the target device 102 such that the first infrared signal and the second infrared signal can be received from the infrared transmission unit disposed on the target device 102.

The infrared signals transmitted by the infrared transmission unit 1021 may form a fan-shaped infrared radiation region 1022. The larger a distance from the infrared transmission unit 1021 is, the wider a coverage scope of the fan-shaped region is, whereas the smaller the distance from the infrared transmission unit is, the smaller the coverage scope of the fan-shaped region is. When the robot is close to the infrared transmission unit 1021, the infrared signals in the fan-shaped region tend to be one infrared line. When any one of the first infrared receiving unit 1011 and the second infrared receiving unit 1012 enters the infrared radiation region 1022, the corresponding infrared receiving unit can receive corresponding infrared signals from the infrared transmission unit 1021. When both of the first infrared receiving unit 1011 and the second infrared receiving unit 1012 enter the infrared radiation region 1022, both of them can receive corresponding infrared signals at the same time, that is, the first infrared receiving unit 1011 can receive the first infrared signal and the second infrared receiving unit 1012 can also receive the second infrared signal. In the embodiments of the present disclosure, based on this characteristic, the first infrared receiving unit 1011 and the second infrared receiving unit 1012 can receive corresponding infrared signals at the same time. In this case, the robot 101 is driven to move toward the target device 102 until the fan-shaped region cannot cover the first infrared receiving unit 1011 and the second infrared receiving unit 1012 at the same time. When the first infrared receiving unit 1011 and the second infrared receiving unit 1012 are close to the infrared transmission unit 1021, the infrared radiation region 1022 tends to be one line and thus cannot cover the first infrared receiving unit 1011 and the second infrared receiving unit 1012 at the same time. Hence, this region may be referred to as an infrared signal blind region. However, because the robot 101 is very close to the target device 102 at this time, the robot 101 may directly move to a docking interface on the target device 102 without changing the moving direction, where the docking interface is close to the infrared transmission unit 1021.

In an exemplary embodiment, the docking scope of the robot 101 and the target device 102, i.e. the above infrared signal blind region, is preset. As shown in FIG. 1, the scope of the infrared signal blind region from the target device 102 is related to the infrared radiation region 1022 of the infrared transmission unit 1021 as well as a distance between the first infrared receiving unit 1011 and the second infrared receiving unit 1012. A size of the infrared radiation region 1022 of the infrared transmission unit 1021 depends on an attribute of the infrared transmission unit 1021. As a result, in an actual application, a corresponding infrared transmission unit 1021 may be selected according to actual situations. The distance between the first infrared receiving unit 1011 and the second infrared receiving unit 1012 may be determined based on the infrared radiation region 1022, for example, the distance between the first infrared receiving unit 1011 and the second infrared receiving unit 1012 is smaller than a maximum distance between two radii of the infrared radiation region 1022. Further, without affecting respective reception of the first infrared signal and the second infrared signal by the first infrared receiving unit 1011 and the second infrared receiving unit 1012, the distance between the first infrared receiving unit 1011 and the second infrared receiving unit 1012 may be set to sufficiently small, such that the infrared signal blind region is minimized. In this way, the final navigation and positioning will be more accurate.

When the infrared radiation region 1022 of the infrared transmission unit 1021 as well as the distance between the first infrared receiving unit 1011 and the second infrared receiving unit 1012 are determined, the infrared signal blind region may be determined. During a navigation process of the robot 101, the distance measuring unit 1013 is used to measure a distance between the robot 101 and the target device 102. Based on this distance, whether the robot 101 enters the infrared signal blind region may be determined. When the robot 101 enters the infrared signal blind region, the first infrared receiving unit 1011 and the second infrared receiving unit 1012 cannot receive the first infrared signal and the second infrared signal at the same time. At this time, because the distance between the robot 101 and the target device 102 is small, the robot 101 may be controlled to directly move to the target device 102 for docking without using the first infrared signal and the second infrared signal. In an actual application, the infrared signal blind region may be adjusted by adjusting the infrared radiation region 1022 and/or the distance between the first infrared receiving unit 1011 and the second infrared receiving unit 1012 and the like, thus adjusting the accuracy of the navigation and the difficulty of the realization.

In some exemplary implementations, the docking of the robot 101 and the target device 102 may be point-to-point docking, that is, a preset position on the robot 101 (for example, a food loading interface on the food taking robot) is docked with a preset position on the target device 102 (for example, a food provision interface on the target device). The docking herein may be understood as contact of the robot 101 and the target device 102 or may be understood as non-contact with a distance therebetween being in a permissible range. Further, the docking of the robot 101 and the target device 102 may also be that interfaces capable of connecting with each other are disposed on the robot 101 and the target device 102 respectively such that the robot 101 and the target device 102 are fixed relatively after being docked.

In an exemplary embodiment of the present disclosure, the robot is provided with two infrared receiving units to receive signals from a same infrared transmission unit on the target device, and thus controls the moving direction of the robot based on the infrared signals received by the two infrared receiving units such that the robot can move toward the target device transmitting infrared signals. Further, when the distance measuring unit disposed on the robot indicates the robot is close to the docking interface of the target device, the robot is controlled to directly move to the target device so as to dock with the target device. In the above technical solutions of exemplary embodiments of the present disclosure, two infrared receiving units, the distance measuring unit and one infrared transmission unit are adopted to achieve accurate navigation for the robot, thus reducing the costs of the navigation system and improving the accuracy.

In an optional implementation of exemplary embodiments of the present disclosure, the first infrared receiving unit 1011 and the second infrared receiving unit 1012 are symmetrically disposed on the robot, and/or, heights of the first infrared receiving unit 1011 and the second infrared receiving unit 1012 from the ground are both the same as a height of the infrared transmission unit 1021 from the ground.

In this optional implementation, the first infrared receiving unit 1011 and the second infrared receiving unit 1012 may be symmetrically disposed on the robot 101 on a same horizontal plane. In order to receive infrared signals from the infrared transmission unit 1021, the heights of the first infrared receiving unit 1011 and the second infrared receiving unit 1012 from the ground may be made equal to the height of the infrared transmission unit 1021 from the ground.

In an optional implementation of exemplary embodiments of the present disclosure, the positions of the first infrared receiving unit 1011, the second infrared receiving unit 1012 and the infrared transmission unit 1021 are also related to positions of the docking interfaces between the robot 101 and the target device 102.

In this optional implementation, a result of an accurate navigation achieved for the robot 101 by using the first infrared signal and the second infrared signal received by the first infrared receiving unit 1011 and the second infrared receiving unit 1012 and the distance signal received by the distance measuring unit 1013 is that a side of the robot 101 where the first infrared receiving unit 1011 and the second infrared receiving unit 1012 are disposed is navigated to a side of the target device 102 where the infrared transmission unit 1021 is disposed. In order to dock the robot 101 with the target device 102, one manner may be adopted as follows: the docking interface disposed on the robot 101 is located at a side where the first infrared receiving unit 1011 and the second infrared receiving unit 1012 are located, the docking interface disposed on the target device 102 is located at a side where the infrared transmission unit 1021 is located, and the two docking interfaces can be docked together after the robot 101 approaches the target device 102 based on the first infrared signal and the second infrared signal; another manner may also be adopted as follows: the docking interface disposed on the robot 101 and/or the target device 102 may be moveable, and after the robot 101 approaches the target device 102 based on the first infrared signal and the second infrared signal, the docking interface on the robot 101 may move to the side where the first infrared receiving unit 1011 and the second infrared receiving unit 1012 are located, and/or, the docking interface on the target device 102 may move to the side where the infrared transmission unit 1021 is located, thus docking the two docking interfaces together.

In an optional implementation of exemplary embodiments of the present disclosure, the distance measuring unit 1013 measures a perpendicular distance from a perpendicular plane where the first infrared receiving unit 1011 and the second infrared receiving unit 1012 are located to the infrared transmission unit 1021.

In an optional implementation of exemplary embodiments of the present disclosure, the distance measuring unit 1013 is a laser ranging sensor which is disposed opposite to a laser ranging plane 1023 of the target device 102, and a height of the laser ranging sensor from the ground is between a top side and a base side of the laser ranging plane; the infrared transmission unit 1021 and the laser ranging plane 1023 are located in a same plane.

In this optional implementation, the distance measuring unit 1013 is a laser ranging sensor. The laser ranging sensor sends a laser signal to the target device right ahead, the laser ranging plane 1023 on the target device 102 reflects the laser signal back to the laser ranging sensor, and the laser ranging sensor may obtain a distance between the laser ranging sensor and the laser ranging plane 1023 based on a time difference between the sent signal and the reflected signal. The laser ranging plane 1023 is a plane on the target device 102, which is perpendicular to the ground. When the robot 101 moves toward the target device 102, because the laser ranging sensor and the laser ranging plane 1023 are disposed oppositely and the height of the laser ranging sensor from the ground is between the top side and the base side of the laser ranging plane 1023, a laser signal sent by the laser ranging sensor to the target device will be received and reflected by the laser ranging plane 1023.

In an optional implementation of exemplary embodiments of the present disclosure, the distance measuring unit 1013 may be disposed on a perpendicular plane where the first infrared receiving unit 1011 and the second infrared receiving unit 1022 are located, and the infrared transmission unit 1021 and the laser ranging plane 1023 are located in a same plane. In this case, a distance obtained by the laser ranging sensor is a perpendicular distance from the plane where the first infrared receiving unit 1011 and the second infrared receiving unit 1022 are located to the infrared transmission unit 1021. Thus, the infrared signal blind region of the infrared transmission unit 1021 can be accurately reflected.

In an optional implementation of exemplary embodiments of the present disclosure, the distance measuring unit 1013 may be disposed between the first infrared receiving unit 1011 and the second infrared receiving unit 1022, that is, the first infrared receiving unit 1011 and the second infrared receiving unit 102 may be disposed symmetrically at both sides of the distance measuring unit 1013.

In an optional implementation of exemplary embodiments of the present disclosure, before obtaining the first infrared signal, the second infrared signal and the distance signal, the processing unit 1014 further obtains position information of the robot 101.

The processing unit 1014 further determines whether the first infrared receiving unit 1011 and the second infrared receiving unit 102 are in the infrared radiation region 1022 of the infrared transmission unit 1021 based on the position information of the robot 101.

In this optional implementation, when the robot 101 is far from the target device 102, the position information of the robot 101 may be roughly obtained by using GPS or indoor positioning device or the like. Usually, the target device 102 has a known fixed position and thus the infrared radiation region 1022 of the infrared transmission unit 1021 is known. Therefore, based on a current position of the robot 101, it is determined whether the robot 101 is in the infrared radiation region 1022 of the infrared transmission unit 1021. That is, when the distance between the robot 101 and the target device 102 approaches a given range, the first infrared receiving unit 1011 and the second infrared receiving unit 1012 can receive infrared signals. At this time, the robot 101 may be driven to move based on whether the first infrared receiving unit 1011 and the second infrared receiving unit 1022 receive the first infrared signal and the second infrared signal respectively at the same time. When the first infrared receiving unit 1011 and the second infrared receiving unit 1022 can receive the first infrared signal and the second infrared signal respectively at the same time, the robot 101 is controlled to move along a current direction; when the first infrared receiving unit 1011 and the second infrared receiving unit 1022 fail to receive the first infrared signal and the second infrared signal respectively at the same time, the robot 101 is controlled to stop to change its moving direction until the first infrared receiving unit 1011 and the second infrared receiving unit 1022 can receive the first infrared signal and the second infrared signal respectively at the same time. After this, the robot 101 may continue moving along the current direction.

In an optional implementation of exemplary embodiments of the present disclosure, the processing unit 1014 is further configured to: in response to determining that the first infrared receiving unit 1011 and the second infrared receiving unit 1012 are not in the infrared radiation region 1022 of the infrared transmission unit 1021, control the robot 101 to move toward the infrared radiation region 1022 of the infrared transmission unit 1021.

In this optional implementation, when it is determined based on rough positioning that the robot 101 does not reach the infrared radiation region 1022 of the infrared transmission unit 1021, the robot 101 is controlled to move toward the infrared radiation region 1022 based on the position information of the infrared radiation region 1022 and the current position information of the robot 101.

In an optional implementation of exemplary embodiments of the present disclosure, the processing unit 1014 is further configured to: in response to determining that the first infrared receiving unit 1011 and the second infrared receiving unit 1012 enter the infrared radiation region 1022 of the infrared transmission unit 1021, control the moving direction of the robot 101 according to the first infrared signal and the second infrared signal.

In this optional implementation, after it is determined based on rough positioning that the robot 101 enters the infrared radiation region 1022 of the infrared transmission unit 1021, the moving direction of the robot 101 is controlled based on the first infrared signal and the second infrared signal. In this way, the robot 101 can be accurately navigated to the docking interface on the target device 102. Although the robot 101 can be navigated to the target device 102 using a rough positioning manner such as GPS or indoor positioning, the robot 101 cannot be accurately navigated to the docking interface of the target device 102 for docking with the robot 101.

In an optional implementation of exemplary embodiments of the present disclosure, when the first infrared receiving unit 1011 and the second infrared receiving unit 1012 receive the first infrared signal and the second infrared signal respectively, the processing unit 1014 controls the robot 101 to move along a current moving direction; and/or, when at least one of the first infrared receiving unit 1011 and the second infrared receiving unit 1012 fails to receive a corresponding signal of the first infrared signal and the second infrared signal, the processing unit 1014 adjusts the moving direction of the robot 101.

In this optional implementation, when the first infrared receiving unit 1011 and the second infrared receiving unit 1012 can receive the first infrared signal and the second infrared signal respectively, it is thought that the first infrared receiving unit 1011 and the second infrared receiving unit 1012 are in the infrared radiation region 1022 of the infrared transmission unit 1021, that is, the current moving direction of the robot 101 is aligned with the docking interface of the target device 102. At this time, the robot 101 may be controlled to move along the current moving direction.

When one of the first infrared receiving unit 1011 and the second infrared receiving unit 1012 cannot receive a corresponding signal of the first infrared signal and the second infrared signal, it is thought that the first infrared receiving unit 1011 or the second infrared receiving unit 1012 is not in the infrared radiation region 1022 of the infrared transmission unit 1021. At this time, the current moving direction of the robot 101 deviates from the docking interface of the target device 102. Thus, the moving direction of the robot 101 may be adjusted, that is, the moving direction may be adjusted while the robot 101 moves, or adjusted after the robot 101 stops, until the first infrared receiving unit 1011 and the second infrared receiving unit 1012 can receive the first infrared signal and the second infrared signal respectively.

In an optional implementation of exemplary embodiments of the present disclosure, the processing unit 1014 may adjust the moving direction of the robot 101 in the following manner:

in response to that the first infrared receiving unit 1011 fails to receive the first infrared signal, the processing unit 1014 controls the robot 101 to move away from the first infrared receiving unit 1011 until the first infrared receiving unit 1011 receives the first infrared signal;

in response to that the second infrared receiving unit 1012 fails to receive the second infrared signal, the processing unit 1014 controls the robot 101 to move away from the second infrared receiving unit 1012 until the second infrared receiving unit 1012 receives the second infrared signal;

in response to that the first infrared receiving unit 1011 fails to receive the first infrared signal and the second infrared receiving unit 1012 also fails to receive the second infrared signal, the processing unit 1014 controls the robot 101 to move away from the first infrared receiving unit 1011 or the second infrared receiving unit 1012 until the first infrared receiving unit 1011 and the second infrared receiving unit 1012 receive the first infrared signal and the second infrared signal respectively.

In this optional implementation, the first infrared receiving unit 1011 and the second infrared receiving unit 1012 are symmetrically disposed. When the robot 101 moves toward the target device 102 along a correct direction, a center point of the first infrared receiving unit 1011 and the second infrared receiving unit 1012 is basically aligned with the infrared transmission unit 1021. When one of the first infrared receiving unit 1011 and the second infrared receiving unit 1012 can receive an infrared signal from the infrared transmission unit while the other cannot receive the infrared signal, it indicates that the center point of the first infrared receiving unit 1011 and the second infrared receiving unit 1012 is not aligned with the infrared transmission unit 1021. Thus, it is required to adjust the moving direction of the robot 101 to enable the center point of the first infrared receiving unit 1011 and the second infrared receiving unit 1012 to be aligned with the infrared transmission unit 1021 again. If the first infrared receiving unit 1011 fails to receive the first infrared signal, it indicates that the first infrared receiving unit 1011 deviates from the infrared radiation region 1022. Hence, by moving the robot 101 away from the first infrared receiving unit 1011 (i.e. moving close to the second infrared receiving unit 1022), the first infrared receiving unit 1011 will be moved into the infrared radiation region 1022 again. Conversely, if the second infrared receiving unit 1012 fails to receive the second infrared signal, it indicates that the second infrared receiving unit 1012 deviates from the infrared radiation region 1022. Hence, by moving the robot 101 away from the second infrared receiving unit 1012 (moving close to the first infrared receiving unit 1011), the second infrared receiving unit 1012 will be moved into the infrared radiation region 1022 again.

The infrared radiation region 1022 is fan-shaped. Thus when the first infrared receiving unit 1011 and the second infrared receiving unit 1012 both deviate from the infrared radiation region 1022, it indicates that the angle of deviation is large. At this time, the robot 101 may be moved in any direction until the first infrared receiving unit 1011 and the second infrared receiving unit 1012 can receive the first infrared signal and the second infrared signal respectively. Of course, if the robot 101 records a relative position between the infrared transmission unit 1021 and the robot 101 during a previous movement, the movement may also be made toward this relative position until the first infrared receiving unit 1011 and the second infrared receiving unit 1012 can receive the first infrared signal and the second infrared signal respectively.

In an optional implementation of exemplary embodiments of the present disclosure, the processing unit 1014 is further configured to determine whether a distance from the first infrared receiving unit 1011 and/or the second infrared receiving unit 1012 to the infrared transmission unit 1021 is smaller than a preset threshold based on the distance signal; and in response to that the distance from the first infrared receiving unit 1011 and/or the second infrared receiving unit 1012 to the infrared transmission unit 1021 is smaller than the preset threshold, determine the robot 101 enters a docking scope.

In this optional implementation, the distance measuring unit 1013 is disposed at a proper position such that a distance measured by the distance measuring unit 1013 corresponds to the distance from the first infrared receiving unit 1011/the second infrared receiving unit 1012 to the infrared transmission unit 1021 (ideally, the distance may be a perpendicular distance from the infrared transmission unit to a line connecting the first infrared receiving unit 1011 and the second infrared receiving unit 1012. When a distance between the first infrared receiving unit 1011 and the second infrared receiving unit 1012 is very small, the distance measured by the distance measuring unit 1013 may approximate to be a distance from the infrared transmission unit 1021 to any one of the first infrared receiving unit 1011 and the second infrared receiving unit 1012.). Because the infrared signal blind region of the infrared transmission unit 1021 may be predetermined, when the distance measuring unit 1013 indicates through measurement that the first infrared receiving unit 1011 and the second infrared receiving unit 1012 enter the infrared signal blind region, it is thought that the robot 101 enters the docking scope. Thus, the preset threshold may be set to a distance from a farthest boundary of the infrared signal blind region to the target device 102.

FIG. 2 is a flowchart of a robot navigation method according to an embodiment of the present disclosure. The robot navigation method may be implemented by the processing unit 1014 in the robot navigation system shown in FIG. 1. As shown in FIG. 2, the robot navigation method may include the following steps S201-S203.

At step S201, a first infrared signal, a second infrared signal and a distance signal are obtained; where the first infrared signal and the second infrared signal are infrared signals received by a first infrared receiving unit and a second infrared receiving unit disposed on a robot from an infrared transmission unit disposed on a target device; the distance signal indicates a distance between the robot and the target device.

At step S202, a moving direction of the robot is controlled according to the first infrared signal and the second infrared signal, and whether the robot enters a docking scope is determined based on the distance signal.

At step S203, when it is determined that the robot enters the docking scope, the robot is controlled to move to the target device to dock with the target device.

In an exemplary embodiment of the present disclosure, the robot 101 may be an intelligent robot having autonomous behavior capability, for example, a sweeping robot, a food taking robot, and a goods delivery robot and the like. The target device 102 may be a device fixed at a preset position to provide resources desired by the robot 101, including express package, foods, and power sources and the like. In a case of in need, the robot 101 may move to the target device 102 and obtain desired resources from the target device 102. Generally, the robot 101 needs to move to a precise position of the target device 102 to obtain corresponding resources correctly from the target device 102. For example, for a food taking robot 101, the robot 101 needs to move to the target device 102 and dock with a food provision interface on the target device 102 through a food loading interface disposed on the robot 101, such that foods on the target device 102 can be correctly loaded onto the robot 101.

The first infrared receiving unit 1011 and the second infrared receiving unit 1012 may be disposed on the robot 101. When the robot 101 moves toward the target device 102, the first infrared receiving unit 1011 and the second infrared receiving unit 1012 are located at a position opposed to the target device 102 such that the first infrared signal and the second infrared signal can be received from the infrared transmission unit disposed on the target device 102.

The infrared signals transmitted by the infrared transmission unit 1021 may form a fan-shaped infrared radiation region 1022. The larger a distance from the infrared transmission unit 1021 is, the wider a coverage scope of the fan-shaped region is, whereas the smaller the distance from the infrared transmission unit is, the smaller the coverage scope of the fan-shaped region is. When the robot is close to the infrared transmission unit 1021, the infrared signals in the fan-shaped region tend to be one infrared line. When any one of the first infrared receiving unit 1011 and the second infrared receiving unit 1012 enters the infrared radiation region 1022, the corresponding infrared receiving unit can receive corresponding infrared signals from the infrared transmission unit 1021. When both of the first infrared receiving unit 1011 and the second infrared receiving unit 1012 enter the infrared radiation region 1022, both of them can receive corresponding infrared signals at the same time, that is, the first infrared receiving unit 1011 can receive the first infrared signal and the second infrared receiving unit 1012 can also receive the second infrared signal. In the embodiments of the present disclosure, based on this characteristic, the first infrared receiving unit 1011 and the second infrared receiving unit 1012 can receive corresponding infrared signals at the same time. In this case, the robot 101 is driven to move toward the target device 102 until the fan-shaped region cannot cover the first infrared receiving unit 1011 and the second infrared receiving unit 1012 at the same time. When the first infrared receiving unit 1011 and the second infrared receiving unit 1012 are close to the infrared transmission unit 1021, the infrared radiation region 1022 tends to be one line and thus cannot cover the first infrared receiving unit 1011 and the second infrared receiving unit 1012 at the same time. Hence, this region may be referred to as an infrared signal blind region. However, because the robot 101 is very close to the target device 102 at this time, the robot 101 may directly move to a docking interface on the target device 102 without changing the moving direction, where the docking interface is close to the infrared transmission unit 1021.

In an exemplary embodiment, the docking scope of the robot 101 and the target device 102, i.e. the above infrared signal blind region, is preset. As shown in FIG. 1, the scope of the infrared signal blind region from the target device 102 is related to the infrared radiation region 1022 of the infrared transmission unit 1021 as well as a distance between the first infrared receiving unit 1011 and the second infrared receiving unit 1012. A size of the infrared radiation region 1022 of the infrared transmission unit 1021 depends on an attribute of the infrared transmission unit 1021. As a result, in an actual application, a corresponding infrared transmission unit 1021 may be selected according to actual situations. The distance between the first infrared receiving unit 1011 and the second infrared receiving unit 1012 may be determined based on the infrared radiation region 1022, for example, the distance between the first infrared receiving unit 1011 and the second infrared receiving unit 1012 is smaller than a maximum distance between two radii of the infrared radiation region 1022. Further, without affecting respective reception of the first infrared signal and the second infrared signal by the first infrared receiving unit 1011 and the second infrared receiving unit 1012, the distance between the first infrared receiving unit 1011 and the second infrared receiving unit 1012 may be set to sufficiently small, such that the infrared signal blind region is minimized. In this way, the final navigation and positioning will be more accurate.

When the infrared radiation region 1022 of the infrared transmission unit 1021 as well as the distance between the first infrared receiving unit 1011 and the second infrared receiving unit 1012 are determined, the infrared signal blind region may be determined. During a navigation process of the robot 101, the distance measuring unit 1013 is used to measure a distance between the robot 101 and the target device 102. Based on this distance, whether the robot 101 enters the infrared signal blind region may be determined. When the robot 101 enters the infrared signal blind region, the first infrared receiving unit 1011 and the second infrared receiving unit 1012 cannot receive the first infrared signal and the second infrared signal at the same time. At this time, because the distance between the robot 101 and the target device 102 is small, the robot 101 may be controlled to directly move to the target device 102 for docking without using the first infrared signal and the second infrared signal. In an actual application, the infrared signal blind region may be adjusted by adjusting the infrared radiation region 1022 and/or the distance between the first infrared receiving unit 1011 and the second infrared receiving unit 1012 and the like, thus adjusting the accuracy of the navigation and the difficulty of the realization.

In some exemplary implementations, the docking of the robot 101 and the target device 102 may be point-to-point docking, that is, a preset position on the robot 101 (for example, a food loading interface on the food taking robot) is docked with a preset position on the target device 102 (for example, a food provision interface on the target device). The docking herein may be understood as contact of the robot 101 and the target device 102 or may be understood as non-contact with a distance therebetween being in a permissible range. Further, the docking of the robot 101 and the target device 102 may also be that interfaces capable of connecting with each other are disposed on the robot 101 and the target device 102 respectively such that the robot 101 and the target device 102 are fixed relatively after being docked.

In an exemplary embodiment of the present disclosure, the robot is provided with two infrared receiving units to receive signals from a same infrared transmission unit on the target device, and thus controls the moving direction of the robot based on the infrared signals received by the two infrared receiving units such that the robot can move toward the target device transmitting infrared signals. Further, when the distance measuring unit disposed on the robot indicates the robot is close to the docking interface of the target device, the robot is controlled to directly move to the target device so as to dock with the target device. In the above technical solutions of exemplary embodiments of the present disclosure, two infrared receiving units, the distance measuring unit and one infrared transmission unit are adopted to achieve accurate navigation for the robot, thus reducing the costs of the navigation system and improving the accuracy.

In an optional implementation of exemplary embodiments of the present disclosure, as shown in FIG. 3, before the first infrared signal, the second infrared signal and the distance signal are obtained in step S201, the method further includes steps S301-S302.

At step S301, position information of the robot is obtained.

At step S302, whether the first infrared receiving unit and the second infrared receiving unit are in the infrared radiation region of the infrared transmission unit is determined based on the position information of the robot.

In this optional implementation, when the robot 101 is far from the target device 102, the position information of the robot 101 may be roughly obtained by using GPS or indoor positioning device or the like. Usually, the target device 102 has a known fixed position and thus the infrared radiation region 1022 of the infrared transmission unit 1021 is known. Therefore, based on a current position of the robot 101, it is determined whether the robot 101 is in the infrared radiation region 1022 of the infrared transmission unit 1021. That is, when the distance between the robot 101 and the target device 102 approaches a given range, the first infrared receiving unit 1011 and the second infrared receiving unit 1012 can receive infrared signals. At this time, the robot 101 may be driven to move based on whether the first infrared receiving unit 1011 and the second infrared receiving unit 1022 receive the first infrared signal and the second infrared signal respectively at the same time. When the first infrared receiving unit 1011 and the second infrared receiving unit 1022 can receive the first infrared signal and the second infrared signal respectively at the same time, the robot 101 is controlled to move along a current direction; when the first infrared receiving unit 1011 and the second infrared receiving unit 1022 fail to receive the first infrared signal and the second infrared signal respectively at the same time, the robot 101 is controlled to stop to change its moving direction until the first infrared receiving unit 1011 and the second infrared receiving unit 1022 can receive the first infrared signal and the second infrared signal respectively at the same time. After this, the robot 101 may continue moving along the current direction.

In an optional implementation of exemplary embodiments of the present disclosure, the method further includes the following step:

in response to determining that the first infrared receiving unit and the second infrared receiving unit are not in the infrared radiation region of the infrared transmission unit, controlling the robot to move toward the infrared radiation region of the infrared transmission unit.

In this optional implementation, when it is determined based on rough positioning that the robot 101 does not reach the infrared radiation region 1022 of the infrared transmission unit 1021, the robot 101 is controlled to move toward the infrared radiation region 1022 based on the position information of the infrared radiation region 1022 and the current position information of the robot 101.

In an optional implementation of exemplary embodiments of the present disclosure, controlling the moving direction of the robot according to the first infrared signal and the second infrared signal in step S202 further includes:

in response to determining that the first infrared receiving unit and the second infrared receiving unit enter the infrared radiation region of the infrared transmission unit, controlling the moving direction of the robot according to the first infrared signal and the second infrared signal.

In this optional implementation, after it is determined based on rough positioning that the robot 101 enters the infrared radiation region 1022 of the infrared transmission unit 1021, the moving direction of the robot 101 is controlled based on the first infrared signal and the second infrared signal. In this way, the robot 101 can be accurately navigated to the docking interface on the target device 102. Although the robot 101 can be navigated to the target device 102 using a rough positioning manner such as GPS or indoor positioning, the robot 101 cannot be accurately navigated to the docking interface of the target device 102 for docking with the robot 101.

In an optional implementation of exemplary embodiments of the present disclosure, controlling the moving direction of the robot according to the first infrared signal and the second infrared signal in step S202 further includes:

in response to that the first infrared receiving unit and the second infrared receiving unit receive the first infrared signal and the second infrared signal respectively, controlling the robot to move along a current moving direction; and/or, in response to that at least one of the first infrared receiving unit and the second infrared receiving unit fails to receive a corresponding signal of the first infrared signal and the second infrared signal, adjusting the moving direction of the robot.

In this optional implementation, when the first infrared receiving unit 1011 and the second infrared receiving unit 1012 can receive the first infrared signal and the second infrared signal respectively, it is thought that the first infrared receiving unit 1011 and the second infrared receiving unit 1012 are in the infrared radiation region 1022 of the infrared transmission unit 1021, that is, the current moving direction of the robot 101 is aligned with the docking interface of the target device 102. At this time, the robot 101 may be controlled to move along the current moving direction.

When one of the first infrared receiving unit 1011 and the second infrared receiving unit 1012 cannot receive a corresponding signal of the first infrared signal and the second infrared signal, it is thought that the first infrared receiving unit 1011 or the second infrared receiving unit 1012 is not in the infrared radiation region 1022 of the infrared transmission unit 1021. At this time, the current moving direction of the robot 101 deviates from the docking interface of the target device 102. Thus, the moving direction of the robot 101 may be adjusted, that is, the moving direction may be adjusted while the robot 101 moves, or adjusted after the robot 101 stops, until the first infrared receiving unit 1011 and the second infrared receiving unit 1012 can receive the first infrared signal and the second infrared signal respectively.

In an optional implementation of exemplary embodiments of the present disclosure, adjusting the moving direction of the robot may further include:

in response to that the first infrared receiving unit fails to receive the first infrared signal, controlling the robot to move away from the first infrared receiving unit until the first infrared receiving unit receives the first infrared signal;

in response to that the second infrared receiving unit fails to receive the second infrared signal, controlling the robot to move away from the second infrared receiving unit until the second infrared receiving unit receives the second infrared signal; where the first infrared receiving unit and the second infrared receiving unit are symmetrically disposed on the robot on a horizontal plane, and heights of the first infrared receiving unit and the second infrared receiving unit from the ground are both the same as a height of the infrared transmission unit from the ground;

in response to that the first infrared receiving unit fails to receive the first infrared signal and the second infrared receiving unit also fails to receive the second infrared signal, controlling, by the processing unit, the robot to move away from the first infrared receiving unit or the second infrared receiving unit until the first infrared receiving unit and the second infrared receiving unit receive the first infrared signal and the second infrared signal respectively.

In this optional implementation, the first infrared receiving unit 1011 and the second infrared receiving unit 1012 are symmetrically disposed. When the robot 101 moves toward the target device 102 along a correct direction, a center point of the first infrared receiving unit 1011 and the second infrared receiving unit 1012 is basically aligned with the infrared transmission unit 1021. When one of the first infrared receiving unit 1011 and the second infrared receiving unit 1012 can receive an infrared signal from the infrared transmission unit while the other cannot receive the infrared signal, it indicates that the center point of the first infrared receiving unit 1011 and the second infrared receiving unit 1012 is not aligned with the infrared transmission unit 1021. Thus, it is required to adjust the moving direction of the robot 101 to enable the center point of the first infrared receiving unit 1011 and the second infrared receiving unit 1012 to be aligned with the infrared transmission unit 1021 again. If the first infrared receiving unit 1011 fails to receive the first infrared signal, it indicates that the first infrared receiving unit 1011 deviates from the infrared radiation region 1022. Hence, by moving the robot 101 away from the first infrared receiving unit 1011 (i.e. moving close to the second infrared receiving unit 1022), the first infrared receiving unit 1011 will be moved into the infrared radiation region 1022 again. Conversely, if the second infrared receiving unit 1012 fails to receive the second infrared signal, it indicates that the second infrared receiving unit 1012 deviates from the infrared radiation region 1022. Hence, by moving the robot 101 away from the second infrared receiving unit 1012 (moving close to the first infrared receiving unit 1011), the second infrared receiving unit 1012 will be moved into the infrared radiation region 1022 again.

The infrared radiation region 1022 is fan-shaped. When the first infrared receiving unit 1011 and the second infrared receiving unit 1012 both deviate from the infrared radiation region 1022, it indicates that the angle of deviation is large. At this time, the robot 101 may be moved in any direction until the first infrared receiving unit 1011 and the second infrared receiving unit 1012 can receive the first infrared signal and the second infrared signal respectively. Of course, if the robot 101 records a relative position between the infrared transmission unit 1021 and the robot 101 during a previous movement, the move may also be made toward this relative position until the first infrared receiving unit 1011 and the second infrared receiving unit 1012 can receive the first infrared signal and the second infrared signal respectively.

In an optional implementation of exemplary embodiments of the present disclosure, as shown in FIG. 4, determining whether the robot enters the docking scope based on the distance signal in step S202 may further include the following steps S401-S402.

At step S401, whether a distance from the first infrared receiving unit and/or the second infrared receiving unit to the infrared transmission unit is smaller than a preset threshold is determined based on the distance signal.

At step S402, in response to that the distance from the first infrared receiving unit and/or the second infrared receiving unit to the infrared transmission unit is smaller than the preset threshold, it is determined that the robot enters the docking scope.

In this optional implementation, the distance measuring unit 1013 is disposed at a proper position such that a distance measured by the distance measuring unit 1013 corresponds to the distance from the first infrared receiving unit 1011/the second infrared receiving unit 1012 to the infrared transmission unit 1021 (ideally, the distance may be a perpendicular distance from the infrared transmission unit to a line connecting the first infrared receiving unit 1011 and the second infrared receiving unit 1012. When a distance between the first infrared receiving unit 1011 and the second infrared receiving unit 1012 is very small, the distance measured by the distance measuring unit 1013 may approximate to be a distance from the infrared transmission unit 1021 to any one of the first infrared receiving unit 1011 and the second infrared receiving unit 1012.). Because the infrared signal blind region of the infrared transmission unit 1021 may be predetermined, when the distance measuring unit 1013 indicates through measurement that the first infrared receiving unit 1011 and the second infrared receiving unit 1012 enter the infrared signal blind region, it is thought that the robot 101 enters the docking scope. Thus, the preset threshold may be set to a distance from a farthest boundary of the infrared signal blind region to the target device 102.

The robot navigation method according to the exemplary embodiments of the present disclosure may be implemented by the processing unit 1014 in the robot navigation system shown in FIG. 1. Therefore, reference may be made to the above descriptions of the robot navigation system for the relevant details and thus no redundant descriptions are made herein.

An apparatus embodiment described below may be used to implement the method embodiments of the present disclosure.

FIG. 5 is a structural block diagram of a robot navigation apparatus according to an embodiment of the present disclosure. This apparatus may be implemented as all or part of an electronic device by software, or hardware or combination thereof. As shown in FIG. 5, the robot navigation apparatus includes:

a first obtaining module 501, configured to obtain a first infrared signal, a second infrared signal, and a distance signal, where the first infrared signal and the second infrared signal are infrared signals received by a first infrared receiving unit and a second infrared receiving unit disposed on a robot from an infrared transmission unit disposed on a target device; the distance signal indicates a distance between the robot and the target device;

a first controlling module 502, configured to control a moving direction of the robot according to the first infrared signal and the second infrared signal, and determine whether the robot enters a docking scope based on the distance signal;

a second controlling module 503, configured to, in response to determining that the robot enters the docking scope, control the robot to move to the target device to dock with the target device.

In an exemplary embodiment of the present disclosure, the robot 101 may be an intelligent robot having autonomous behavior capability, for example, a sweeping robot, a food taking robot, and a goods delivery robot and the like. The target device 102 may be a device fixed at a preset position to provide resources desired by the robot 101, including express package, foods, and power sources and the like. In a case of in need, the robot 101 may move to the target device 102 and obtain desired resources from the target device 102. Generally, the robot 101 needs to move to a precise position of the target device 102 to obtain corresponding resources correctly from the target device 102. For example, for a food taking robot 101, the robot 101 needs to move to the target device 102 and dock with a food provision interface on the target device 102 through a food loading interface disposed on the robot 101, such that foods on the target device 102 can be correctly loaded onto the robot 101.

The first infrared receiving unit 1011 and the second infrared receiving unit 1012 may be disposed on the robot 101. When the robot 101 moves toward the target device 102, the first infrared receiving unit 1011 and the second infrared receiving unit 1012 are located at a position opposed to the target device 102 such that the first infrared signal and the second infrared signal can be received from the infrared transmission unit disposed on the target device 102.

The infrared signals transmitted by the infrared transmission unit 1021 may form a fan-shaped infrared radiation region 1022. The larger a distance from the infrared transmission unit 1021 is, the wider a coverage scope of the fan-shaped region is, whereas the smaller the distance from the infrared transmission unit is, the smaller the coverage scope of the fan-shaped region is. When the robot is close to the infrared transmission unit 1021, the infrared signals in the fan-shaped region tend to be one infrared line. When any one of the first infrared receiving unit 1011 and the second infrared receiving unit 1012 enters the infrared radiation region 1022, the corresponding infrared receiving unit can receive corresponding infrared signals from the infrared transmission unit 1021. When both of the first infrared receiving unit 1011 and the second infrared receiving unit 1012 enter the infrared radiation region 1022, both of them can receive corresponding infrared signals at the same time, that is, the first infrared receiving unit 1011 can receive the first infrared signal and the second infrared receiving unit 1012 can also receive the second infrared signal. In the embodiments of the present disclosure, based on this characteristic, the first infrared receiving unit 1011 and the second infrared receiving unit 1012 can receive corresponding infrared signals at the same time. In this case, the robot 101 is driven to move toward the target device 102 until the fan-shaped region cannot cover the first infrared receiving unit 1011 and the second infrared receiving unit 1012 at the same time. When the first infrared receiving unit 1011 and the second infrared receiving unit 1012 are close to the infrared transmission unit 1021, the infrared radiation region 1022 tends to be one line and thus cannot cover the first infrared receiving unit 1011 and the second infrared receiving unit 1012 at the same time. Hence, this region may be referred to as an infrared signal blind region. However, because the robot 101 is very close to the target device 102 at this time, the robot 101 may directly move to a docking interface on the target device 102 without changing the moving direction, where the docking interface is close to the infrared transmission unit 1021.

In an exemplary embodiment, the docking scope of the robot 101 and the target device 102, i.e. the above infrared signal blind region, is preset. As shown in FIG. 1, the scope of the infrared signal blind region from the target device 102 is related to the infrared radiation region 1022 of the infrared transmission unit 1021 as well as a distance between the first infrared receiving unit 1011 and the second infrared receiving unit 1012. A size of the infrared radiation region 1022 of the infrared transmission unit 1021 depends on an attribute of the infrared transmission unit 1021. As a result, in an actual application, a corresponding infrared transmission unit 1021 may be selected according to actual situations. The distance between the first infrared receiving unit 1011 and the second infrared receiving unit 1012 may be determined based on the infrared radiation region 1022, for example, the distance between the first infrared receiving unit 1011 and the second infrared receiving unit 1012 is smaller than a maximum distance between two radii of the infrared radiation region 1022. Further, without affecting respective reception of the first infrared signal and the second infrared signal by the first infrared receiving unit 1011 and the second infrared receiving unit 1012, the distance between the first infrared receiving unit 1011 and the second infrared receiving unit 1012 may be set to sufficiently small, such that the infrared signal blind region is minimized. In this way, the final navigation and positioning will be more accurate.

When the infrared radiation region 1022 of the infrared transmission unit 1021 and the distance between the first infrared receiving unit 1011 and the second infrared receiving unit 1012 are determined, the infrared signal blind region may be determined. During a navigation process of the robot 101, the distance measuring unit 1013 is used to measure a distance between the robot 101 and the target device 102. Based on this distance, whether the robot 101 enters the infrared signal blind region may be determined. When the robot 101 enters the infrared signal blind region, the first infrared receiving unit 1011 and the second infrared receiving unit 1012 cannot receive the first infrared signal and the second infrared signal at the same time. At this time, because the distance between the robot 101 and the target device 102 is small, the robot 101 may be controlled to directly move to the target device 102 for docking without using the first infrared signal and the second infrared signal. In an actual application, the infrared signal blind region may be adjusted by adjusting the infrared radiation region 1022 and/or the distance between the first infrared receiving unit 1011 and the second infrared receiving unit 1012 and the like, thus adjusting the accuracy of the navigation and the difficulty of the realization.

In some exemplary implementations, the docking of the robot 101 and the target device 102 may be point-to-point docking, that is, a preset position on the robot 101 (for example, a food loading interface on the food taking robot) is docked with a preset position on the target device 102 (for example, a food provision interface on the target device).

The docking herein may be understood as contact of the robot 101 and the target device 102 or may be understood as non-contact with a distance therebetween being in a permissible range. Further, the docking of the robot 101 and the target device 102 may also be that interfaces capable of connecting with each other are disposed on the robot 101 and the target device 102 respectively such that the robot 101 and the target device 102 are fixed relatively after being docked.

In an exemplary embodiment of the present disclosure, the robot is provided with two infrared receiving units to receive signals from a same infrared transmission unit on the target device, and thus controls the moving direction of the robot based on the infrared signals received by the two infrared receiving units such that the robot can move toward the target device transmitting infrared signals. Further, when the distance measuring unit disposed on the robot indicates the robot is close to the docking interface of the target device, the robot is controlled to directly move to the target device so as to dock with the target device. In the above technical solutions of exemplary embodiments of the present disclosure, two infrared receiving units, the distance measuring unit and one infrared transmission unit are adopted to achieve accurate navigation for the robot, thus reducing the costs of the navigation system and improving the accuracy.

In an optional implementation of exemplary embodiments of the present disclosure, as shown in FIG. 6, before the first obtaining module 501, the apparatus further includes:

a second obtaining module 601, configured to obtain position information of the robot;

a determining module 602, configured to determine whether the first infrared receiving unit and the second infrared receiving unit are in the infrared radiation region of the infrared transmission unit based on the position information of the robot.

In this optional implementation, when the robot 101 is far from the target device 102, the position information of the robot 101 may be roughly obtained by using GPS or indoor positioning device or the like. Usually, the target device 102 has a known fixed position and thus the infrared radiation region 1022 of the infrared transmission unit 1021 is known. Therefore, based on a current position of the robot 101, it is determined whether the robot 101 is in the infrared radiation region 1022 of the infrared transmission unit 1021. That is, when the distance between the robot 101 and the target device 102 approaches a given range, the first infrared receiving unit 1011 and the second infrared receiving unit 1012 can receive infrared signals. At this time, the robot 101 may be driven to move based on whether the first infrared receiving unit 1011 and the second infrared receiving unit 1022 receive the first infrared signal and the second infrared signal respectively at the same time. When the first infrared receiving unit 1011 and the second infrared receiving unit 1022 can receive the first infrared signal and the second infrared signal respectively at the same time, the robot 101 is controlled to move along a current direction; when the first infrared receiving unit 1011 and the second infrared receiving unit 1022 fail to receive the first infrared signal and the second infrared signal respectively at the same time, the robot 101 is controlled to stop to change its moving direction until the first infrared receiving unit 1011 and the second infrared receiving unit 1022 can receive the first infrared signal and the second infrared signal respectively at the same time. After this, the robot 101 may continue moving along the current direction.

In an optional implementation of exemplary embodiments of the present disclosure, the apparatus further includes:

a third controlling module, configured to, in response to determining that the first infrared receiving unit and the second infrared receiving unit are not in the infrared radiation region of the infrared transmission unit, control the robot toward the infrared radiation region of the infrared transmission unit.

In this optional implementation, when it is determined based on rough positioning that the robot 101 does not reach the infrared radiation region 1022 of the infrared transmission unit 1021, the robot 101 is controlled to move toward the infrared radiation region 1022 based on the position information of the infrared radiation region 1022 and the current position information of the robot 101.

In an optional implementation of exemplary embodiments of the present disclosure, the first controlling module 502 further includes:

a first controlling sub-module, configured to, in response to determining that the first infrared receiving unit and the second infrared receiving unit enter the infrared radiation region of the infrared transmission unit, control the moving direction of the robot based on the first infrared signal and the second infrared signal.

In this optional implementation, after it is determined based on rough positioning that the robot 101 enters the infrared radiation region 1022 of the infrared transmission unit 1021, the moving direction of the robot 101 is controlled based on the first infrared signal and the second infrared signal. In this way, the robot 101 can be accurately navigated to the docking interface on the target device 102. Although the robot 101 can be navigated to the target device 102 using a rough positioning manner such as GPS or indoor positioning, the robot 101 cannot be accurately navigated to the docking interface of the target device 102 for docking with the robot 101.

In an optional implementation of exemplary embodiments of the present disclosure, the first controlling module 502 further includes:

a second controlling sub-module, configured to, in response to that the first infrared receiving unit and the second infrared receiving unit receive the first infrared signal and the second infrared signal respectively, control the robot to move along a current moving direction; and/or, an adjusting sub-module, configured to, in response to that at least one of the first infrared receiving unit and the second infrared receiving unit fails to receive a corresponding signal of the first infrared signal and the second infrared signal, adjust the moving direction of the robot.

In this optional implementation, when the first infrared receiving unit 1011 and the second infrared receiving unit 1012 can receive the first infrared signal and the second infrared signal respectively, it is thought that the first infrared receiving unit 1011 and the second infrared receiving unit 1012 are in the infrared radiation region 1022 of the infrared transmission unit 1021, that is, the current moving direction of the robot 101 is aligned with the docking interface of the target device 102. At this time, the robot 101 may be controlled to move along the current moving direction.

When one of the first infrared receiving unit 1011 and second infrared receiving unit 1012 cannot receive a corresponding signal of the first infrared signal and the second infrared signal, it is thought that the first infrared receiving unit 1011 or the second infrared receiving unit 1012 is not in the infrared radiation region 1022 of the infrared transmission unit 1021. At this time, the current moving direction of the robot 101 deviates from the docking interface of the target device 102. Thus, the moving direction of the robot 101 may be adjusted, that is, the moving direction may be adjusted while the robot 101 moves, or adjusted after the robot 101 stops, until the first infrared receiving unit 1011 and the second infrared receiving unit 1012 can receive the first infrared signal and the second infrared signal respectively.

In an optional implementation of exemplary embodiments of the present disclosure, the adjusting sub-module further includes:

a third controlling sub-module, configured to, in response to that the first infrared receiving unit fails to receive the first infrared signal, control the robot to move away from the first infrared receiving unit until the first infrared receiving unit receives the first infrared signal;

a fourth controlling sub-module, configured to, in response to that the second infrared receiving unit fails to receive the second infrared signal, control the robot to move away from the second infrared receiving unit until the second infrared receiving unit receives the second infrared signal; where the first infrared receiving unit and the second infrared receiving unit are symmetrically disposed on the robot on a horizontal plane, and heights of the first infrared receiving unit and the second infrared receiving unit from the ground are both the same as a height of the infrared transmission unit from the ground;

the processing unit, configured to, in response to that the first infrared receiving unit fails to receive the first infrared signal and the second infrared receiving unit also fails to receive the second infrared signal, control the robot to move away from the first infrared receiving unit or the second infrared receiving unit until the first infrared receiving unit and the second infrared receiving unit receive the first infrared signal and the second infrared signal respectively.

In this optional implementation, the first infrared receiving unit 1011 and the second infrared receiving unit 1012 are symmetrically disposed. When the robot 101 moves toward the target device 102 along a correct direction, a center point of the first infrared receiving unit 1011 and the second infrared receiving unit 1012 is basically aligned with the infrared transmission unit 1021. When one of the first infrared receiving unit 1011 and the second infrared receiving unit 1012 can receive an infrared signal from the infrared transmission unit while the other cannot receive the infrared signal, it indicates that the center point of the first infrared receiving unit 1011 and the second infrared receiving unit 1012 is not aligned with the infrared transmission unit 1021. Thus, it is required to adjust the moving direction of the robot 101 to enable the center point of the first infrared receiving unit 1011 and the second infrared receiving unit 1012 to be aligned with the infrared transmission unit 1021 again. If the first infrared receiving unit 1011 fails to receive the first infrared signal, it indicates that the first infrared receiving unit 1011 deviates from the infrared radiation region 1022. Hence, by moving the robot 101 away from the first infrared receiving unit 1011 (i.e. moving close to the second infrared receiving unit 1022), the first infrared receiving unit 1011 will be moved into the infrared radiation region 1022 again. Conversely, if the second infrared receiving unit 1012 fails to receive the second infrared signal, it indicates that the second infrared receiving unit 1012 deviates from the infrared radiation region 1022. Hence, by moving the robot 101 away from the second infrared receiving unit 1012 (moving close to the first infrared receiving unit 1011), the second infrared receiving unit 1012 will be moved into the infrared radiation region 1022 again.

The infrared radiation region 1022 is fan-shaped. When the first infrared receiving unit 1011 and the second infrared receiving unit 1012 both deviate from the infrared radiation region 1022, it indicates that the angle of deviation is large. At this time, the robot 101 may be moved in any direction until the first infrared receiving unit 1011 and the second infrared receiving unit 1012 can receive the first infrared signal and the second infrared signal respectively. Of course, if the robot 101 records a relative position between the infrared transmission unit 1021 and the robot 101 during a previous movement, the movement may also be made toward this relative position until the first infrared receiving unit 1011 and the second infrared receiving unit 1012 can receive the first infrared signal and the second infrared signal respectively.

In an optional implementation of exemplary embodiments of the present disclosure, as shown in FIG. 7, the first controlling module 502 further includes:

a judging sub-module 701, configured to determine whether a distance from the first infrared receiving unit and/or the second infrared receiving unit to the infrared transmission unit is smaller than a preset threshold based on the distance signal; and a determining sub-module 702, configured to, in response to that the distance from the first infrared receiving unit and/or the second infrared receiving unit to the infrared transmission unit is smaller than the preset threshold, determine the robot enters the docking scope.

In this optional implementation, the distance measuring unit 1013 is disposed at a proper position such that a distance measured by the distance measuring unit 1013 corresponds to the distance from the first infrared receiving unit 1011/the second infrared receiving unit 1012 to the infrared transmission unit 1021 (ideally, the distance may be a perpendicular distance from the infrared transmission unit to a line connecting the first infrared receiving unit 1011 and the second infrared receiving unit 1012. When a distance between the first infrared receiving unit 1011 and the second infrared receiving unit 1012 is very small, the distance measured by the distance measuring unit 1013 may approximate to be a distance from the infrared transmission unit 1021 to any one of the first infrared receiving unit 1011 and the second infrared receiving unit 1012.). Because the infrared signal blind region of the infrared transmission unit 1021 may be predetermined, when the distance measuring unit 1013 indicates through measurement that the first infrared receiving unit 1011 and the second infrared receiving unit 1012 enter the infrared signal blind region, it is thought that the robot 101 enters the docking scope. Thus, the preset threshold may be set to a distance from a farthest boundary of the infrared signal blind region to the target device 102.

An embodiment of the present disclosure provides an electronic device. As shown in FIG. 8, the electronic device includes at least one processor 801, and a memory 802 in communication connection with the at least one processor 801, where the memory 802 stores instructions which are executed by the at least one processor to:

obtain a first infrared signal, a second infrared signal and a distance signal; where the first infrared signal and the second infrared signal are infrared signals received by a first infrared receiving unit and a second infrared receiving unit disposed on a robot from an infrared transmission unit disposed on a target device; the distance signal indicates a distance between the robot and the target device;

control a moving direction of the robot according to the first infrared signal and the second infrared signal, and determine whether the robot enters a docking scope based on the distance signal;

in response to determining that the robot enters the docking scope, control the robot to move to the target device to dock with the target device.

Before obtaining the first infrared signal, the second infrared signal and the distance signal, the method further includes:

obtaining position information of the robot;

determining whether the first infrared receiving unit and the second infrared receiving unit are in an infrared radiation region of the infrared transmission unit according to the position information of the robot.

The processor is further configured to implement the following steps:

in response to determining that the first infrared receiving unit and the second infrared receiving unit are not in the infrared radiation region of the infrared transmission unit, controlling the robot to move toward the infrared radiation region of the infrared transmission unit.

Controlling the moving direction of the robot according to the first infrared signal and the second infrared signal includes:

in response to determining that the first infrared receiving unit and the second infrared receiving unit enter the infrared radiation region of the infrared transmission unit, controlling the moving direction of the robot according to the first infrared signal and the second infrared signal.

Controlling the moving direction of the robot according to the first infrared signal and the second infrared signal includes:

in response to that the first infrared receiving unit and the second infrared receiving unit receive the first infrared signal and the second infrared signal respectively, controlling the robot to move along a current moving direction; and/or, in response to that at least one of the first infrared receiving unit and the second infrared receiving unit fails to receive a corresponding signal of the first infrared signal and the second infrared signal, adjusting the moving direction of the robot.

Adjusting the moving direction of the robot includes:

in response to that the first infrared receiving unit fails to receive the first infrared signal, controlling the robot to move away from the first infrared receiving unit until the first infrared receiving unit receives the first infrared signal;

in response to that the second infrared receiving unit fails to receive the second infrared signal, controlling the robot to move away from the second infrared receiving unit until the second infrared receiving unit receives the second infrared signal; where the first infrared receiving unit and the second infrared receiving unit are symmetrically disposed on the robot on a horizontal plane, and heights of the first infrared receiving unit and the second infrared receiving unit from the ground are both the same as a height of the infrared transmission unit from the ground;

in response to that the first infrared receiving unit fails to receive the first infrared signal and the second infrared receiving unit also fails to receive the second infrared signal, controlling, by the processing unit, the robot to move away from the first infrared receiving unit or the second infrared receiving unit until the first infrared receiving unit and the second infrared receiving unit receive the first infrared signal and the second infrared signal respectively.

Determining whether the robot enters the docking scope based on the distance signal includes:

determining whether a distance from the first infrared receiving unit and/or the second infrared receiving unit to the infrared transmission unit is smaller than a preset threshold based on the distance signal; and in response to that the distance from the first infrared receiving unit and/or the second infrared receiving unit to the infrared transmission unit is smaller than the preset threshold, determining the robot enters the docking scope. Specifically, the processor 801 and the memory 802 may be connected by bus or the like as shown in FIG. 8. The memory 802, as a non-volatile computer readable storage medium, may be used to store non-volatile software programs, non-volatile computer-executable programs and modules. The processor 801 may execute the non-volatile software programs, instructions and modules stored in the memory 802 to implement various functional applications and data processing of the device, thus implementing the above method according to the exemplary embodiments of the present disclosure.

The memory 802 may include a program storage zone and a data storage zone. The program storage zone may store operating system, and application programs desired by at least one function, and the data storage zone may store historical data of navigation network transportation and the like. Furthermore, the memory 802 may include a high-speed random access memory or a non-volatile memory, for example, at least one disk storage device, flash memory device, or other non-volatile solid state memory device. In some implementations, the electronic device may optionally include a communication component 803, and the memory 802 may optionally include a memory set up remotely relative to the processor 801. These remote memories may connect with an external device via the communication component 803. The instances of the above network include but not limited to internet, corporate intranet, local area network, mobile communication network and a combination thereof.

One or more modules are stored in the memory 802. The one or more modules are executed by one or more processors 801 to implement the above method according to the embodiments of the present disclosure.

The above product is capable of implementing the method according to the embodiments of the present disclosure. The functional modules and beneficial effects corresponding to the implementations are generated. The technical details not detailed in the embodiments of the present disclosure may be referred to the method according to the embodiments of the present disclosure.

The flowcharts and block diagrams in the accompanying drawings illustrate possible system architectures, functions and operations of systems, methods and computer program products according to various embodiments of the present disclosure. Each block in the flowcharts and the block diagrams may represent one module, one program segment or part of codes, which include one or more executable instructions for implementing the specified logic functions. It is also noted that in some alternative implementations, functions marked in the blocks may be executed in a sequence different from that marked in the accompanying drawings. For example, two blocks in succession may actually be executed in parallel or may be executed in a reverse sequence depending on the functions involved. It is also noted that each block in the block diagrams and/or flowcharts and combinations of blocks in the block diagrams and/or flowcharts may be implemented by a dedicated hardware-based system for executing the specified functions or operations, or by combination of dedicated hardware and computer instructions.

The units or modules involved in the embodiments of the present disclosure may be implemented by software or hardware. The described units or modules may also be set in the processor, and the names of these units or modules do not constitute limitation to these units or modules in some case.

According to another aspect of the embodiments of the present disclosure, provided is a computer readable storage medium. The computer readable storage medium may be the computer readable storage medium included in the electronic device in the above embodiments or may be a separate computer readable storage medium un-assembled into the device. The computer readable storage medium stores one or more programs which are executed by one or more processors to implement the method according to the exemplary embodiments of the present disclosure.

The above descriptions are made to the preferred embodiments and the employed technical principles of the present disclosure. Those skilled in the art should understand that the scope or protection of the present disclosure is not limited to the technical solutions formed by specific combinations of the above technical features but includes other technical solutions formed by any combination of the above technical features or equivalent features without departing from the idea of the present disclosure, for example, those technical solutions formed by mutual replacement of the above technical features and the technical features having similar functions disclosed in the present disclosure.

What is claimed is:

1. A robot navigation system, comprising a first infrared receiver, a second infrared receiver, a distance measuring sensor, and a processing unit, wherein, the first infrared receiver and the second infrared receiver are disposed on a robot to receive a first infrared signal and a second infrared signal from an infrared transmitter respectively, wherein the infrared transmitter is disposed on a target device;

the distance measuring sensor is disposed on the robot to obtain a distance signal indicating a distance between the robot and the target device;

the processing unit is configured to:

obtain the first infrared signal, the second infrared signal and the distance signal;

control a moving direction of the robot based on the first infrared signal and the second infrared signal, so that the moving direction before the robot enters a docking scope is aligned with a docking interface on the target device, and control the robot to move to the target device to dock with the target device in response to determining that the robot enters the docking scope based on the distance signal, wherein the docking scope is defined by a predetermined infrared signal blind region, and the infrared signal blind region comprises an area where infrared radiation of the infrared transmitter is unable to cover the first infrared receiver and the second infrared receiver simultaneously, and the robot enters the infrared signal blind region and directly moves to the docking interface on the target device without using the first infrared signal and the second infrared signal and without changing the aligned moving direction, wherein entry of the robot into the infrared signal blind region is determined based on a known shape and location of the infrared signal blind region, and the entry into the infrared signal blind region serves as an indicator that the robot is aligned with the docking interface of the target device, and as a trigger to initiate a straight-line docking of the robot without changing the aligned moving direction, and the infrared signal blind region is predetermined based on an infrared radiation region of the infrared transmitter as well as a distance between the first infrared receiver and the second infrared receiver.

2. The robot navigation system according to claim 1, wherein the first infrared receiver and the second infrared receiver are symmetrically disposed on the robot; and/or, heights of the first infrared receiver and the second infrared receiver from the ground are both the same as a height of the infrared transmitter from the ground.

3. The robot navigation system according to claim 2, wherein the distance measuring sensor comprises a laser ranging sensor which is disposed opposite to a laser ranging plane of the target device, and a height of the laser ranging sensor from the ground is between a top side and a base side of the laser ranging plane;

the infrared transmitter and the laser ranging plane are located in a same plane.

4. The robot navigation system according to claim 1, wherein the processing unit is further configured to:

before obtaining the first infrared signal, the second infrared signal and the distance signal, obtain position information of the robot;

determine whether the first infrared receiver and the second infrared receiver are in an infrared radiation region of the infrared transmitter according to the position information of the robot.

5. The robot navigation system according to claim 4, wherein the processing unit is further configured to:

in response to determining that the first infrared receiver and the second infrared receiver are not in the infrared radiation region of the infrared transmitter, control the robot to move toward the infrared radiation region of the infrared transmitter.

6. The robot navigation system according to claim 4, wherein the processing unit is further configured to:

in response to determining that the first infrared receiver and the second infrared receiver enter the infrared radiation region of the infrared transmitter, control the moving direction of the robot according to the first infrared signal and the second infrared signal.

7. The robot navigation system according to claim 6, wherein the processing unit is further configured to:

in response to that the first infrared receiver and the second infrared receiver receive the first infrared signal and the second infrared signal respectively, control the robot to move along a current moving direction; and/or, in response to that at least one of the first infrared receiver and the second infrared receiver fails to receive a corresponding signal of the first infrared signal and the second infrared signal, adjust the moving direction of the robot.

8. The robot navigation system according to claim 7, wherein the processing unit adjusts the moving direction of the robot in the following manner:

in response to that the first infrared receiver fails to receive the first infrared signal, the processing unit controls the robot to move in a direction pointing from the first infrared receiver to the second infrared receiver until the first infrared receiver receives the first infrared signal;

in response to that the second infrared receiver fails to receive the second infrared signal, the processing unit controls the robot to move in a direction pointing from the second infrared receiver to the first infrared receiver until the second infrared receiver receives the second infrared signal;

in response to that the first infrared receiver fails to receive the first infrared signal and the second infrared receiver also fails to receive the second infrared signal, the processing unit controls the robot to move in a direction pointing from the first infrared receiver to the second infrared receiver or in a direction pointing from the second infrared receiver to the first infrared receiver until the first infrared receiver and the second infrared receiver receive the first infrared signal and the second infrared signal respectively.

9. The robot navigation system according to claim 1, wherein the processing unit is further configured to:

determine whether a distance from the first infrared receiver and/or the second infrared receiver to the infrared transmitter is smaller than a preset threshold based on the distance signal; and in response to that the distance from the first infrared receiver and/or the second infrared receiver to the infrared transmitter is smaller than the preset threshold, determine the robot enters the docking scope.

10. A robot navigation method, comprising:

obtaining a first infrared signal, a second infrared signal and a distance signal; wherein the first infrared signal and the second infrared signal are infrared signals received by a first infrared receiver and a second infrared receiver disposed on a robot from an infrared transmitter disposed on a target device; the distance signal indicates a distance between the robot and the target device;

controlling a moving direction of the robot according to the first infrared signal and the second infrared signal, so that the moving direction before the robot enters a docking scope is aligned with a docking interface on the target device, and determining whether the robot enters the docking scope based on the distance signal;

in response to determining that the robot enters the docking scope, controlling the robot to move to the target device to dock with the target device, wherein the docking scope is defined by a predetermined infrared signal blind region, and the infrared signal blind region comprises an area where infrared radiation of the infrared transmitter is unable to cover the first infrared receiver and the second infrared receiver simultaneously, and the robot enters the infrared signal blind region and directly moves to the docking interface on the target device without using the first infrared signal and the second infrared signal and without changing the aligned moving direction, wherein entry of the robot into the infrared signal blind region is determined based on a known shape and location of the infrared signal blind region, and the entry into the infrared signal blind region serves as an indicator that the robot is aligned with the docking interface of the target device, and as a trigger to initiate a straight-line docking of the robot without changing the aligned moving direction, and the infrared signal blind region is predetermined based on an infrared radiation region of the infrared transmitter as well as a distance between the first infrared receiver and the second infrared receiver.

11. The method according to claim 10, wherein before obtaining the first infrared signal, the second infrared signal and the distance signal, the method further comprises:

obtaining position information of the robot;

determining whether the first infrared receiver and the second infrared receiver are in an infrared radiation region of the infrared transmitter according to the position information of the robot.

12. The method according to claim 11, further comprising:

in response to determining that the first infrared receiver and the second infrared receiver are not in the infrared radiation region of the infrared transmitter, controlling the robot to move toward the infrared radiation region of the infrared transmitter.

13. The method according to claim 12, wherein controlling the moving direction of the robot according to the first infrared signal and the second infrared signal comprises:

in response to determining that the first infrared receiver and the second infrared receiver enter the infrared radiation region of the infrared transmitter, controlling the moving direction of the robot according to the first infrared signal and the second infrared signal.

14. The method according to claim 10, wherein controlling the moving direction of the robot according to the first infrared signal and the second infrared signal comprises:

in response to that the first infrared receiver and the second infrared receiver receive the first infrared signal and the second infrared signal respectively, controlling the robot to move along a current moving direction; and/or, in response to that at least one of the first infrared receiver and the second infrared receiver fails to receive a corresponding signal of the first infrared signal and the second infrared signal, adjusting the moving direction of the robot.

15. The method according to claim 14, wherein adjusting the moving direction of the robot comprises:

in response to that the first infrared receiver fails to receive the first infrared signal, controlling the robot to move in a direction pointing from the first infrared receiver to the second infrared receiver until the first infrared receiver receives the first infrared signal;

in response to that the second infrared receiver fails to receive the second infrared signal, controlling the robot to move in a direction pointing from the second infrared receiver to the first infrared receiver until the second infrared receiver receives the second infrared signal;

wherein the first infrared receiver and the second infrared receiver are symmetrically disposed on the robot on a horizontal plane, and heights of the first infrared receiver and the second infrared receiver from the ground are both the same as a height the infrared transmitter from the ground;

in response to that the first infrared receiver fails to receive the first infrared signal and the second infrared receiver also fails to receive the second infrared signal, controlling the robot to move in a direction pointing from the first infrared receiver to the second infrared receiver or in a direction pointing from the second infrared receiver to the first infrared receiver until the first infrared receiver and the second infrared receiver receive the first infrared signal and the second infrared signal respectively.

16. The method according to claim 10, wherein determining whether the robot enters the docking scope based on the distance signal comprises:

determining whether a distance from the first infrared receiver and/or the second infrared receiver to the infrared transmitter is smaller than a preset threshold based on the distance signal; and in response to that the distance from the first infrared receiver and/or the second infrared receiver to the infrared transmitter is smaller than the preset threshold, determining the robot enters the docking scope.

17. An electronic device, comprising a memory and a processor, wherein, the memory stores one or more computer instructions, and the one or more computer instructions are executed by the processor to implement the following method steps:

obtaining a first infrared signal, a second infrared signal and a distance signal; wherein the first infrared signal and the second infrared signal are infrared signals received by a first infrared receiver and a second infrared receiver disposed on a robot from an infrared transmitter disposed on a target device; the distance signal indicates a distance between the robot and the target device;

controlling a moving direction of the robot according to the first infrared signal and the second infrared signal, so that the moving direction before the robot enters a docking scope is aligned with a docking interface on the target device, and determining whether the robot enters the docking scope based on the distance signal;

in response to determining that the robot enters the docking scope, controlling the robot to move to the target device to dock with the target device, wherein the docking scope is defined by a predetermined infrared signal blind region, and the infrared signal blind region comprises an area where infrared radiation of the infrared transmitter is unable to cover the first infrared receiver and the second infrared receiver simultaneously, and the robot enters the infrared signal blind region and directly moves to the docking interface on the target device without using the first infrared signal and the second infrared signal and without changing the aligned moving direction, wherein entry of the robot into the infrared signal blind region is determined based on a known shape and location of the infrared signal blind region, and the entry into the infrared signal blind region serves as an indicator that the robot is aligned with the docking interface of the target device, and as a trigger to initiate a straight-line docking of the robot without changing the aligned moving direction, and the infrared signal blind region is predetermined based on an infrared radiation region of the infrared transmitter as well as a distance between the first infrared receiver and the second infrared receiver.

18. The electronic device according to claim 17, wherein before obtaining the first infrared signal, the second infrared signal and the distance signal, the processor further implements the following method steps:

obtaining position information of the robot;

determining whether the first infrared receiver and the second infrared receiver are in an infrared radiation region of the infrared transmitter according to the position information of the robot.

19. The electronic device according to claim 18, wherein the processor further implements the following method steps:

in response to determining that the first infrared receiver and the second infrared receiver are not in the infrared radiation region of the infrared transmitter, controlling the robot to move toward the infrared radiation region of the infrared transmitter.

20. The electronic device according to claim 19, wherein controlling the moving direction of the robot according to the first infrared signal and the second infrared signal comprises:

in response to determining that the first infrared receiver and the second infrared receiver enter the infrared radiation region of the infrared transmitter, controlling the moving direction of the robot according to the first infrared signal and the second infrared signal.

\* \* \* \* \*